(12) United States Patent
Phelan et al.

(10) Patent No.: US 10,845,461 B2
(45) Date of Patent: Nov. 24, 2020

(54) SYSTEM AND METHOD FOR ENABLING RADAR OPERATION IN A SPECTRALLY CONGESTED ENVIRONMENT

(71) Applicant: U.S. Army Research Laboratory, Adelphi, MD (US)

(72) Inventors: Brian R. Phelan, Silver Spring, MD (US); Marc Allan Ressler, College Park, MD (US); Kenneth I. Ranney, Monrovia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 268 days.

(21) Appl. No.: 16/000,452

(22) Filed: Jun. 5, 2018

(65) Prior Publication Data
US 2018/0348341 A1    Dec. 6, 2018

Related U.S. Application Data

(60) Provisional application No. 62/515,625, filed on Jun. 6, 2017.

(51) Int. Cl.
*G01S 7/295*     (2006.01)
*G01S 13/89*    (2006.01)
(Continued)

(52) U.S. Cl.
CPC .............. *G01S 7/295* (2013.01); *G01S 7/023* (2013.01); *G01S 7/2813* (2013.01); *G01S 13/89* (2013.01); *G01S 7/2955* (2013.01); *G01S 13/90* (2013.01)

(58) Field of Classification Search
CPC ........ G01S 7/295; G01S 7/023; G01S 7/2813; G01S 13/89; G01S 7/2955; G01S 13/90
(Continued)

(56) References Cited

U.S. PATENT DOCUMENTS 5,686,922 A     11/1997 Stankwitz et al.
6,445,334 B1 *  9/2002 Bradley .................... G01S 7/20
                                                          342/195
(Continued)

OTHER PUBLICATIONS

J. Tsao, B. Steinberg, "Reduction of Sidelobe and Speckle Artifacts in Microwave Imaging: The CLEAN Technique," IEEE Transactions on Antennas and Propagation, vol. 36, No. 4, Apr. 1988, pp. 543-556.
(Continued)

*Primary Examiner* — Bo Fan
(74) *Attorney, Agent, or Firm* — Eric B. Compton

(57) ABSTRACT

Embodiments of the present invention implement a novel methodology for processing radar image data from a radar system having one or more transmitter and receiver antenna pairs. The novel methodology deliberately operates on spectrally-notched radar data. It uses a specially-adapted version of the CLEAN algorithm to mitigate the effects of frequency-band notching. Following that, it performs a nonlinear sidelobe-reduction algorithm to further eliminate artifacts and produce radar imagery of much higher quality. In some cases, it exploits a specific version of the recursive sidelobe minimization (RSM) algorithm which operates in the frequency and aperture (spatial) domain.

17 Claims, 14 Drawing Sheets

Frequency Mixing Scheme

(51) Int. Cl.
*G01S 7/02* (2006.01)
*G01S 7/28* (2006.01)
*G01S 13/90* (2006.01)

(58) Field of Classification Search
USPC .............................. 342/169, 22, 27, 195, 179
See application file for complete search history.

(56) References Cited

U.S. PATENT DOCUMENTS

| | | | | |
|---|---|---|---|---|
| 6,834,073 | B1* | 12/2004 | Miller | G01S 7/023 375/130 |
| 7,248,207 | B2 | 7/2007 | Ohnishi | |
| 7,796,829 | B2 | 9/2010 | Nguyen et al. | |
| 8,665,132 | B2 | 3/2014 | Ranney et al. | |
| 8,824,544 | B2 | 9/2014 | Nguyen et al. | |
| 9,395,437 | B2 | 7/2016 | Ton et al. | |
| 2003/0164973 | A1* | 9/2003 | Hisatomi | H04N 1/00864 358/1.15 |
| 2006/0248954 | A1* | 11/2006 | Snieder | G01H 17/00 73/570 |
| 2011/0163912 | A1* | 7/2011 | Ranney | G01S 13/90 342/25 F |
| 2015/0061926 | A1* | 3/2015 | Ranney | G01S 13/9089 342/25 B |
| 2018/0348341 | A1* | 12/2018 | Phelan | G01S 7/023 |

OTHER PUBLICATIONS

J. McCorkle and L. Nguyen, "Focusing of dispersive targets using synthetic aperture radar," Adelphi, MD, Tech. Rep. ARL-TR-305, Aug 1994.

H. C. Stanwitz, et al, "Nonlinear Apodization for Sidelobe Control in SAR Imagery", IEEE Transactions on Aerospace and Electronic Systems, vol. 31, No. 1, Jan. 1995, pp. 267-279.

W.G. Carrara, R. S. Goodman, R. M. Majewski, "Spotlight Synthetic Aperture Radar Signal Processing Algorithms," © 1995, Artech House, Norwood, MA, Chapter 3, pp. 88-109.

T. Miller, L. Potter, J. Mccorkle, "RFI Suppression for Ultra-Wideband Radar," IEEE Transactions on Aerospace and Electronic Systems, vol. 33, No. 4, 1997, pp. 1142-1156.

R. M. Narayanan, "Radar imaging using spectrally fragmented ultrawideband (UWB) noise waveforms," in Proc. 14th AFOSR Electromagnetics Workshop, San Antonio, TX, Jan. 2003, pp. P4-P5.

L. Nguyen, T. Ton, D. Wong, M. Soumekh, "Adaptive coherent suppression of multiple wide-bandwidth RFI sources in SAR", Proc. SPIE 5427, Algorithms for Synthetic Aperture Radar Imagery XI, (Sep. 2, 2004); doi: 10.1117/12.542466.

K. Kulpa, "The Clean Type Algorithms for Radar Signal Processing," MRRS-2008 Symposium Proceedings. Kiev, Ukraine, Sep. 22-24, 2008, pp. 152-157.

L. Nguyen, "Signal and image processing algorithms for the U.S. Army Research Laboratory ultra-wideband (UWB) synchronous impulse reconstruction (SIRE) radar," The Army Research Laboratory, Adelphi, MD, Tech. Rep. ARL-TR-4784, Apr. 2009.

B. Feng, T. Wang, C. Liu, C. Chen, W. Chen, "An Effective CLEAN Algorithm for Interference Cancellation and Weak Target Detection in Passive Radar," 2013 Asia-Pacific Conference on Synthetic Aperture Radar (APSAR), pp. 160-163.

L. Nguyen, T. Tran, T. Do, "Sparse Models and Sparse Recovery for UltraWideband SAR Applications," IEEE Transactions on Aerospace and Electronic Systems. vol. 50, No. 2, pp. 940-958.

Brian R. Phelan, Kelly D. Sherbondy, Kenneth I. Ranney and Ram M. Narayanan, "Design and performance of an ultra-wideband stepped-frequency radar with precise frequency control for landmine and IED detection," Proc. of SPIE vol. 9077, 907708-1, 2014.

Brian R. Phelan, Marc A. Ressler, Kenneth I. Ranney, Gregory D. Smith, Getachew A. Kirose, Kelly D. Sherbondy, and Ram M. Narayanan, "Performance analysis of spectrally versatile forward-looking ground-penetrating radar for detection of concealed targets," Proc. of SPIE vol. 9461, 94610J-2, 2015.

Brian R. Phelan, Marc A. Ressler, Kenneth I. Ranney, Gregory D. Smith, Kelly D. Sherbondy, and Ram M. Narayanan, "Frequency Notching Effects on GPR Imagery while Operating in Crowded Spectrum Scenarios," Proc. of SPIE vol. 3829, 982905, 2016.

Brian Phelan's PhD dissertation at the Pennsylvania State University, titled "Theory, Design, Analysis, and Implementation of a Spectrally Agile Frequency-Incrementing Reconfigurable (SAFIRE) Forward-Looking Ground Penetrating Radar," dated Aug. 2016, and which is expected to be made publicly available at: https://etda.libraries.psu.edu/catalog/ks65hc213 (As of Aug. 14, 2018, only an abstract is available at this site). Slide presentations disclosed as part of Brian Phelan's Ph.D. defense presented at the Pennsylvania State University on Jun. 9, 2016.

* cited by examiner

Real Radar Array

Synthetic Aperture Radar (SAR)

**Back Projection
(example for Rx5)**

CLEAN-Notch Processing Results

(a) "Un-CLEANed" Image.

(b) First target (largest peak) removed.

(c) Second target removed. This is the residual.

(d) CLEANed image with ideal target responses added back to residual.

Recursive Sidelobe Minimization (RSM) Processing

Results of Novel Processing Combining CLEAN-Notch and RSM: Example 1

SYSTEM AND METHOD FOR ENABLING RADAR OPERATION IN A SPECTRALLY CONGESTED ENVIRONMENT

CROSS-REFERENCE TO RELATED APPLICATION(S) AND DOCUMENTS

This application claims the benefit of U.S. Provisional Patent Application No. 62/515,625 filed Jun. 6, 2017, the disclosure of which is herein incorporated by reference in its entirety.

GOVERNMENT INTEREST

The embodiments herein may be manufactured, used, and/or licensed by or for the United States Government without the payment of royalties thereon.

FIELD

The invention generally relates to radar, and more particularly to, systems and methods for enabling radar operation in a spectrally congested environment.

BACKGROUND OF THE INVENTION

A limitation of many radar systems is that they cannot effectively operate in an appreciable radio frequency interference (RFI) environment. That is, they are either susceptible to RFI or they are prohibited from being used in environments where the system's RF emissions might interfere with other high-priority systems (e.g., critical control systems or emergency services).

In the past, various approaches have been employed to mitigate the effects of RFI on radar data. Since many RFI sources are relatively narrow band, attempts are often made to filter out the unwanted signal by simply attenuating the interfering frequency bands. Some radar architectures (e.g. stepped-frequency radars) are able to completely avoid RFI frequency bands by omitting them during a frequency sweep. This approach, however, is far from ideal because missing data in the frequency domain introduces sidelobes in the time (range) domain.

Conventional signal processing approaches, such as RSM and CLEAN, have been used to enhance target responses in the presence of noise/clutter in radar imagery. Recursive Sidelobe Minimization (RSM) is a technique which suppresses sidelobe artifacts in radar imagery by applying a minimization operator over images formed after removing randomly selected data points from a given data set. The RSM technique may be applied over an antenna aperture (RSM-A), over I/Q frequency data (RSM-F), and over an antenna aperture and I/Q frequency data (RSM-AF). These techniques have been shown to reduce sidelobes in the down and cross-range domains depending on use. Greater iterations of RSM typically improve results, but as the number of iterations increases the improvement after each iteration diminishes. RSM is ineffective when a large fraction of the radar's operating frequency band is notched.

The CLEAN algorithm is used to remove sidelobe artifacts by de-convolving them from formed radar imagery, based on a priori knowledge of the frequency notches. It subtracts a theoretical notched point-spread function (PSF) from the imaged target location, and then adds a theoretical un-notched PSF in its place. Some versions of CLEAN have been used to address RFI problems, but they assume that the entire spectrum is available and no spectral notching is required.

Other approaches that have been implemented attempt to model the RFI signal using passive measurements of the RF background. The resulting RFI estimate is then subtracted from the current active data record. This approach is similar to the CLEAN algorithm.

SUMMARY OF INVENTION

Embodiments of the present invention implement a novel methodology for processing radar image data from a radar system having one (or more) transmitter and receiver antenna pair(s). The novel methodology deliberately relies upon spectrally-notched radar data. It uses a specially-adapted version of the CLEAN algorithm to mitigate the effects of the notching. Following that, it performs a non-linear sidelobe-reduction algorithm to further eliminate artifacts and produce radar imagery of much higher quality. In some cases, it exploits a specific version of the recursive sidelobe minimization (RSM) algorithm (which operates on frequency domain data samples) to further eliminate artifacts and produce radar imagery of much higher quality.

While the notching procedure may be beneficial for avoiding RFI and regulated spectra, it unfortunately degrades radar imagery. The novel methodology thus proceeds from the assumption that frequency notching is to be incorporated. This could be a result not only of large RFI sources, but also of transmission restrictions imposed by local spectrum regulators/managers. Once a degraded reference signal has been specified/required, then it is ideal to mitigate the artifacts introduced by the (required) notching.

The inventors' adaptation and reformulation of the CLEAN algorithm operates on this severely degraded version of the received signal in an effort to eliminate the downrange sidelobes which arise from the notching. It may be referred to as the CLEAN-Notch algorithm. This represents a fundamental departure from the original CLEAN algorithm that assumes a complete response has been received. Also, when CLEAN is traditionally adapted for RFI removal, it is also typically assumed that a contiguous frequency band is being used.

Following the exploitation of the re-formulated CLEAN algorithm, a non-linear sidelobe-reduction algorithm is then applied. For instance, the non-linear sidelobe-reduction algorithm may be a recursive sidelobe minimization algorithm or a dual- or multi-apodization algorithm.

According to embodiments, methods for processing radar image data from a radar system having one or more transmitter and receiver antenna pairs are disclosed. In brief, these methods may include the following steps:
1. receiving radar data having frequency-domain notching in which select data at pre-determined frequency bands has been excised;
2. de-convolving the notched target responses from estimated target locations, and inserting the theoretical un-notched target responses at the estimated target locations;
3. subsequently performing a non-linear sidelobe-reduction algorithm; and
4. outputting an improved radar image which has a reduction in artifacts caused by frequency-domain notching.

In step 3 here, the non-linear sidelobe-reduction algorithm may be a recursive sidelobe minimization algorithm or a dual- or multi-apodization algorithm. According to the former, a modified version of the RSM algorithm tailored for a stepped frequency radar system is applied. RSM is a recursive, non-linear algorithm (relying on excision of randomly selected frequency samples). The RSM algorithm is a non-linear and randomized process, so it must be applied after the deterministic, re-formulated CLEAN algorithm.

The combination of the modified CLEAN and RSM algorithms is not conventional and represents an advance in the state of the art.

According to one embodiment, a more specific method for processing radar image data from a radar system having one or more transmitter and receiver antenna pairs is disclosed. The method may include the following steps:
  (a) receiving radar data having frequency-domain notching in which select data at pre-determined frequency bands has been excised;
  (b) forming notched high-resolution range profiles (HRRP) for each transmitter and receiver antenna pair from the notched radar data;
  (c) forming a notched-frequency radar image from the notched radar data;
  (d) determining a peak in intensity above a specified threshold in the notched-frequency radar image,
  (e) calculating the two-way distance for the location of the peak for each transmitter and receiver antenna pair.
  (f) subtracting a 1-dimensional (1-D) theoretical notched point spread function (PSF), corresponding to the peak from the corresponding HRRP for each transmitter and receiver antenna pair;
  (g) repeating steps (c)-(f), as necessary, until a predetermined conditional is satisfied for other peaks above the predetermined threshold;
  (h) adding the 1-D theoretical un-notched PSF for each determined peak at the corresponding location for each transmitter and receiver antenna pairs to obtain an un-notched radar image;
  (i) performing inverse Fourier transforms on the HRRPs to obtain frequency domain data from a current un-notched radar image;
  (j) randomly selecting data points which are set to nil in order to form a partial-data radar image;
  (k) performing a minimum operator on the current un-notched radar image with the partial-data radar image, resulting in an updated current un-notched radar image where each pixel is determined by the minimum between the absolute values of the corresponding pixel from the current un-notched radar image and the partial data radar image, wherein complex pixel information of the current un-notched radar image is replaced with the corresponding complex pixel information of the partial data radar image if the absolute value of that pixel in the partial radar image is less than that of the current un-notched radar image;
  (l) repeating steps (j)-(k), as necessary, until a predetermined condition is satisfied; and
  (m) outputting an improved radar image which has a reduction in artifacts caused by frequency-domain notching.

The methods make use of notched radar data. For instance, (i) the radar system is configured to avoid operation in the pre-determined frequency bands, or (ii) additional signal processing is performed on the radar data to excise the pre-determined frequency bands. The pre-determined frequency bands are generally selected to avoid radio frequency interference and/or restricted or regulated frequency bands.

Various subroutines and modifications/adaption of the above steps are possible. For instance, in step (b), a back projection process is utilized. In step (d), the predetermined condition may be a peak-to-average-sidelobe ratio in the partially cleaned image or the number of targets expected. In a preferred embodiment, during the first iteration of step (d), the highest peak in intensity is determined. Moreover, data within a specified distance of the location of a determined peak are neglected as subsequent peak candidates. In step (e), a coordinate grid relative to the ground is defined corresponding to the image pixel locations, and the coordinates of all transmitter and receiver antennas are known. The number of peaks in step (h) can be pre-defined, e.g., based on the expected number of expected targets. In step (j), the number of randomly selected data points may be less than the product of the number of aperture positions of, and the number of frequencies sampled by, the radar system. In step (l), the predetermined condition may be a peak-to-sidelobe ratio criteria or the number of targets expected, and/or, in step (l), the predetermined condition is a predetermined number of iterations (such as 50-, 100-, 200- or even more). The one or more transmitter and receiver antenna pairs in the radar may be implemented using a real antenna array and/or synthetic aperture radar in various embodiments.

According to various embodiments, a controller is provided for use with a radar system having one or more transmitter and receiver antenna pairs configured to execute machine-executable instructions enabling the controller to implement the novel method. The controller may be incorporated in a radar system or operatively associated therewith, such as in an image processing computer in various embodiments. For instance, a spectrally agile radar system includes and operates with the controller.

These and other embodiments will be described in further detail below with respect to the following figures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

FIG. 1A shows a radar system architecture for a stepped-frequency radar, FIG. 1B shows an example of the receiver mixing scheme for the stepped-frequency radar, and FIG. 1C is a timing diagram for the radar system of FIG. 1A.

(In FIG. 4A and FIG. 4B, "TS RFI" denotes "target scene radio frequency interference".)

Figure 1A:
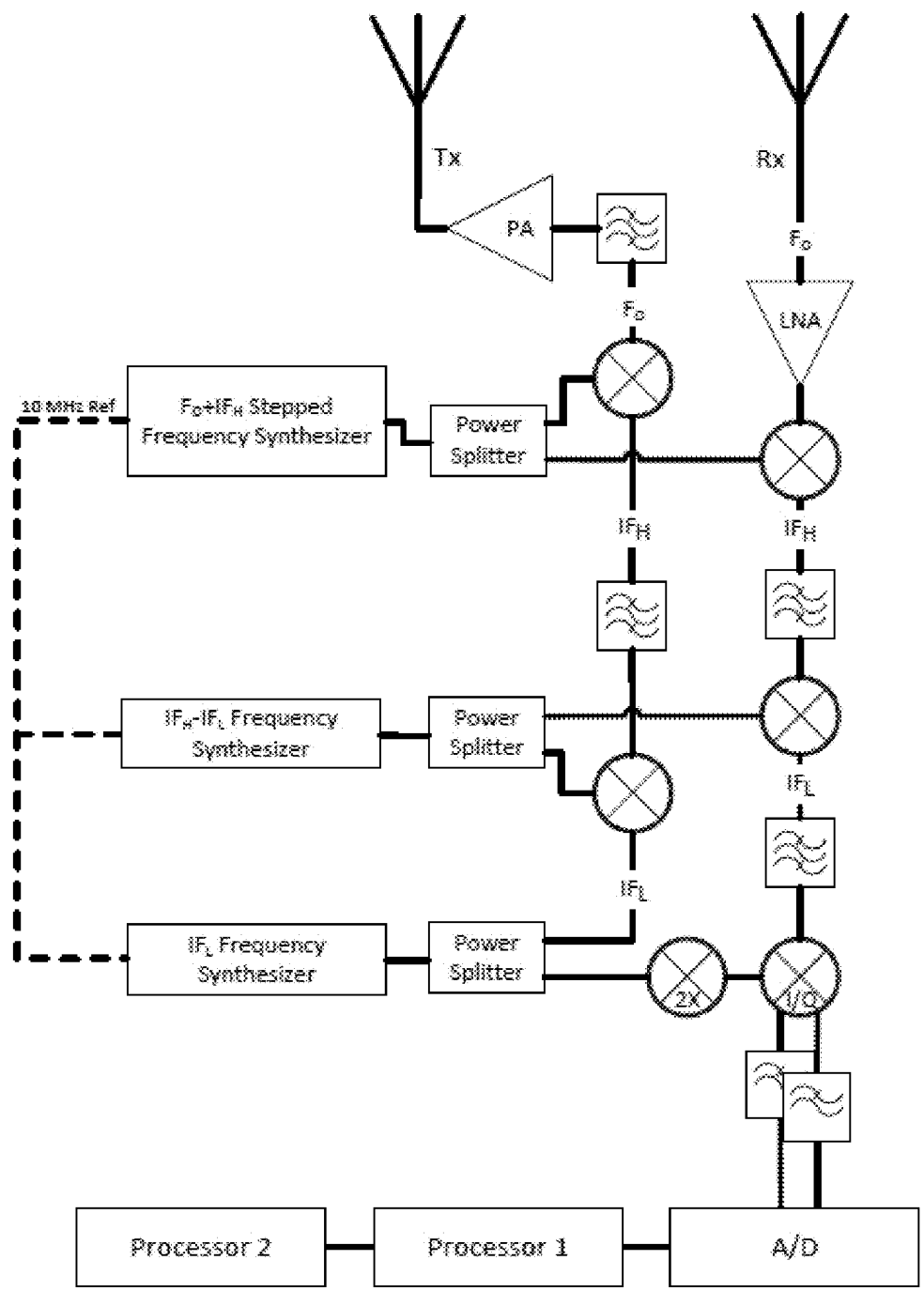
FIGS. 1A-1C are diagrams showing the architecture and operations of a radar system which may be used to implement and practice embodiments of the present invention, where

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION OF EMBODIMENTS

The inventors describe a novel methodology for processing radar image data from a radar system having one or more transmitter and receiver antenna pair combinations. The novel methodology deliberately relies upon spectrally notched radar data. It uses a specially-adapted version of the CLEAN algorithm to mitigate the effects of the notching. Following that, it exploits a specific version of the RSM algorithm in the frequency domain to further eliminate artifacts and produce radar imagery of much higher quality. It is embodied in the various methods and systems (including processors and machine-executable instruction) disclosed herein.

Aspects related to the invention are discussed in Brian Phelan's PhD dissertation at The Pennsylvania State University, titled "Theory, Design, Analysis, and Implementation of a Spectrally Agile Frequency-Incrementing Reconfigurable (SAFIRE) Forward-Looking Ground Penetrating Radar," (hereinafter "the Phelan PhD dissertation") which is expected to be made publicly available around the time of filing of this patent application or shortly thereafter at: https://etda.libraries.psu.edu/catalog/ks65hc213; the disclosure of which is herein incorporated by reference in its entirety. A copy of the slide presentation disclosed as part of Brian Phelan's Ph.D. defense presented at the Pennsylvania State University on Jun. 9, 2016 was appended to and formed a basis of the aforementioned '625 provisional patent application.

Radar Systems.

Figure 1B:
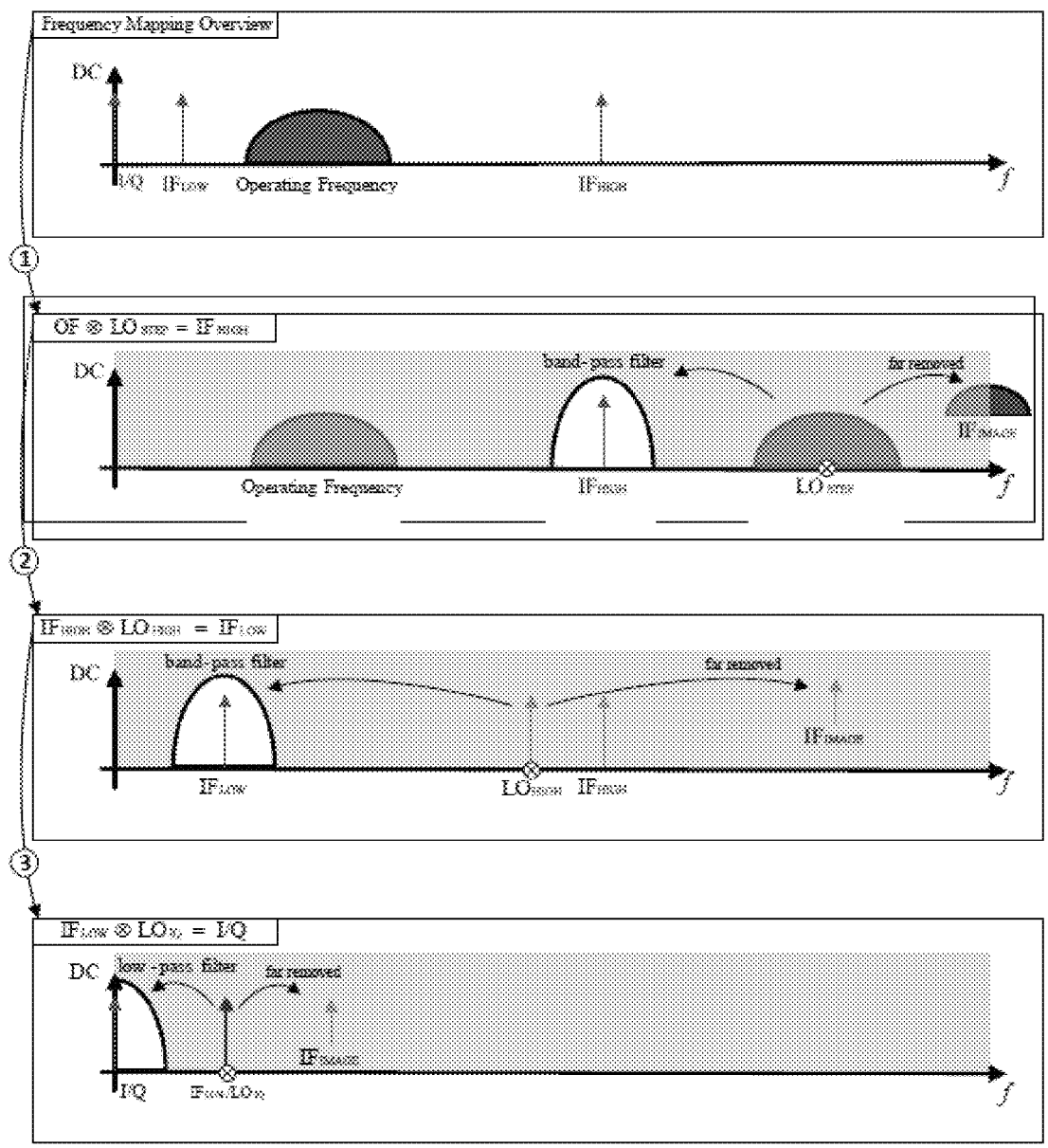
Figure 1C:
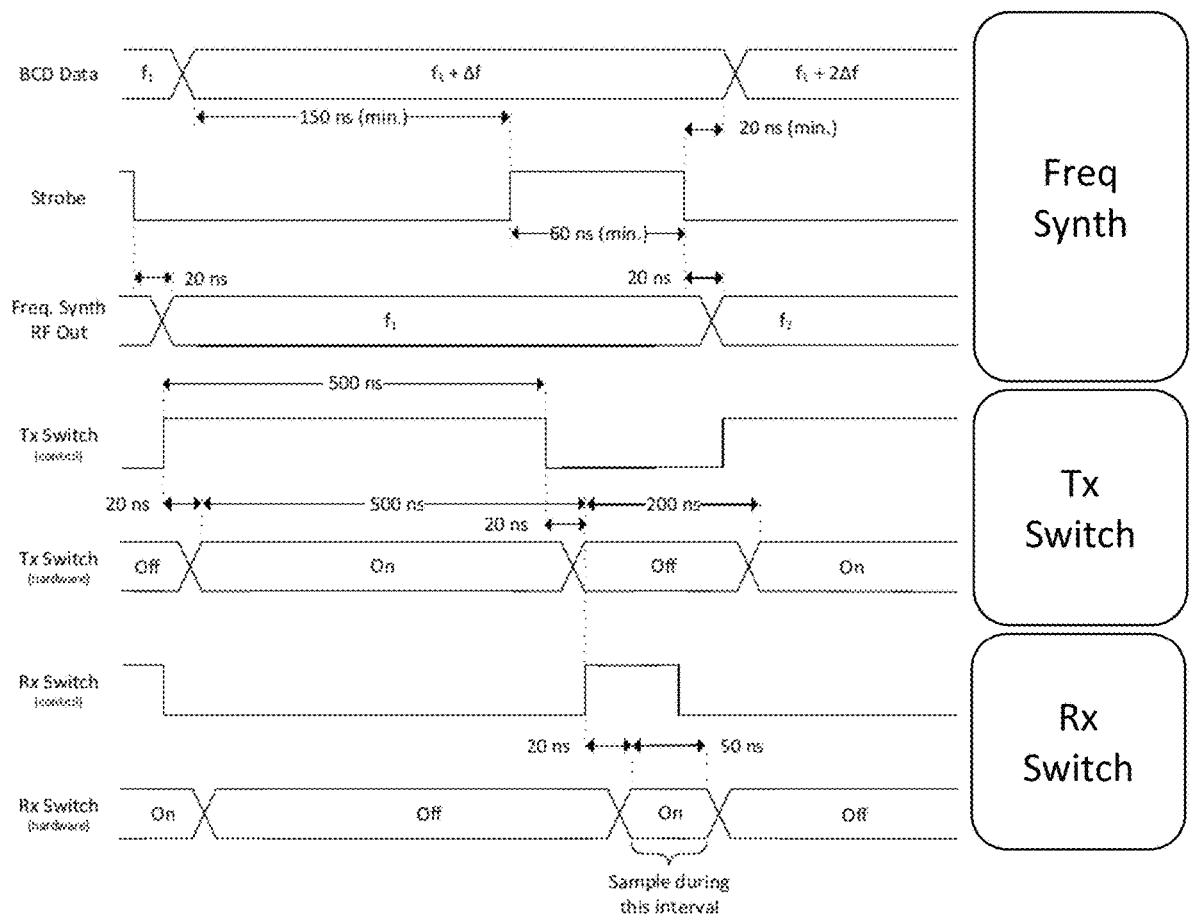

FIGS. 1A-1C are diagrams showing the architecture and operations of a radar system which may be used to implement and practice embodiments of the present invention. The Spectrally Agile Frequency-Incrementing Reconfigurable, or "SAFIRE," radar system, developed at the U.S. Army Research Laboratory, is one non-limiting example of such a radar system. The SAFIRE system is designed to mitigate the receiver's susceptibility to RFI and also offers "on-the-fly" reconfigurability; allowing it to be configured to not interfere with sensitive or federally controlled frequencies. One application of this system is a forward looking, ground penetrating radar (FLGPR) system. Such a system is configured to detect concealed/buried objects in radio frequency (RF) crowded environments.

In one implementation, the SAFIRE radar system is configured as a mobile, forward-looking ground-penetrating (FLGPR) radar utilizing a uniform linear array of sixteen (16) Vivaldi notch receive antennas and two (2) Quad-ridge horn transmit antennas. It consists of sixteen (16) receive channels. This number of channels is non-limiting; in fact, a 4-channel system was originally used to test and validate the SAFIRE design. The SAFIRE system has an operating frequency band which ranges from 300-2,000 MHz, and a minimum frequency step-size of 1-MHz. The radar system is capable of illuminating range swaths that have maximum extents of 30 to 150 meters (programmable). The SAFIRE system can be used to determine the practicality of detecting and classifying buried and concealed objects from safe standoff distances.

The pulse width of each transmit frequency can vary between 200 ns and 1 µs, which correspond to range swaths of 30 to 150 meters, respectively. The system uses a laboratory-grade frequency synthesizer which has a specified switching speed of <200 ns. The SAFIRE utilizes a Field Programmable Gate Array (FPGA) which allows for 5-ns intervals between various system triggers (e.g. transmit/receive switches, frequency synthesizer control, and analog sample timing).

Referring to FIG. 1A, the radar system includes a transmitter connected to a transmitter antenna (denoted as Tx) and a receiver connected to a receiver antenna (denoted as Rx). The transmitter generates a transmitted signal which is amplified by a power amplifier PA and transmitted via the Tx antenna. The transmitter only transmits one narrowband signal at a time. The transmitted RF signal reflects from a target and the receiver antenna Rx receives the reflected signal from the target.

The system is a stepped-frequency radar which exhibits a high degree of frequency selectivity. The system is of a super-heterodyne architecture, which is formed of three mixing stages in the receiver. This architecture was chosen so that harmonics and intermodulation products caused by the reception of RFI nearby the current operating frequency would be mixed further away from the desired signal, which could then be filtered, and mixed down to a secondary IF stage until finally being mixed to I/Q baseband components. The selection of LO frequencies (which in turn dictate the IF frequencies), resulted in a large separation (in frequency) between the wanted (IF) signal, and the unwanted signals (intermodulation products and harmonics).

The three mixing stages use one or more frequency synthesizers to generate a specific LO signal. For example, one stage could use a variable frequency synthesizer while the other stages use fixed-frequency oscillators. The frequency synthesizer may be implemented using an Aeroflex FS5000 as a non-limiting example. This exemplary frequency synthesizer is capable of producing frequencies ranging from 300 to 18,000 MHz. The minimum frequency step of the Aeroflex FS5000 is 1-MHz, for instance, so the user can select increments of 1 MHz as the system step size; but increments greater than about 5 MHz could be problematic. The frequency-step size has a direct implication on the maximum unambiguous range. A frequency step-size greater than 5-MHz results in a maximum unambiguous range of ~30 m or less. For some applications, this may not be acceptable; but, for other applications, it might be desirable.

The output from each of the signal generators is split and components are fed to both the transmitter and receiver. The same signals are used to synthesize the transmitted signal and to act as local oscillators in the receiver mixing stages; this allows for coherent operation without the need of digitizing a transmit waveform replica.

The transmitted signal is synthesized by the mixing of three signal generator outputs. One of the signal generators has a variable frequency output which "steps" through the operating band at a user-defined frequency step size. The number of frequency steps is dictated by the operating bandwidth of the radar system and the aforementioned frequency step size. This parameter is directly related to the sweep speed and resulting rate-of-advance.

The remaining signal generators output a fixed frequency which dictates the intermediate frequencies (IF) used in the receiver. Each mixer output in the transmitter is filtered to reduce spurious products which would reduce the integrity of the transmit waveform. Finally, the transmit waveform is amplified by a power amplifier PA before it is fed to the transmit antenna.

The first synthesizer generates a signal having a frequency of $F_o+IF_H$. The second synthesizer generates a signal having a frequency of $IF_H-IF_L$. And finally, the third synthesizer generates a signal having a frequency of $IF_L$. $F_O$ is the current operating frequency, $IF_H$ is the "high-frequency" IF, and $IF_L$ is the "low-frequency" IF. Here, $IF_H>F_O>IF_L$. The three synthesizers are locked to the same reference signal, i.e., a 10 MHz reference.

The IF frequencies should be chosen to avoid signal corruption due to mixing harmonics, LO leakage, and image frequency issues. The lowest IF may be less than half the lowest operating frequency of 300 MHz, for example. And the higher IF may be greater than three times the highest operating frequency of 2,000 MHz, for example. The lower- and higher-frequency IF signals will be denoted as $IF_L$ and $IF_H$, respectively. The signal genesis is as follows: The $IF_L$ signal is generated by a fixed-frequency oscillator, and $IF_H$ is produced by mixing $IF_L$ with the output of a fixed-frequency oscillator operating at $IF_H-IF_L$. A frequency synthesizer produces a signal at $F_O+IF_H$, where $F_O$ denotes the current operating frequency. The current operating frequency to be transmitted is finally created by mixing the frequency synthesizer output with $IF_H$, and low-pass filtering below Mi. The local oscillator (LO), and all mixing harmonics are filtered out by the low-pass filter. After filtering and amplification the signal is transmitted via a quad-ridged horn antenna.

The receiver antenna Rx receives an RF signal. The returned signals passes through a low noise amplifier (LNA). The signal then passes through a switch, which will either act as a termination (during receiver blanking) or a pass-through to the rest of the receiver. After passing through more amplification and filtering stages, the received signal is mixed with an LO that is stepped in sync with the transmitted waveform (and therefore the received signal) resulting in a constant $IF_{HIGH}$ frequency. The $IF_{HIGH}$ is then filtered and amplified, and mixed down to the $IF_{LOW}$ frequency. After additional filtering and amplification stages, the $IF_{LOW}$ signal is passed through a variable attenuator which is used to limit the signal's power level to avoid saturation of the analog-to-digital converter (ADC). The $IF_{LOW}$ is then sent to an I/Q demodulator which yields the phase difference between the returned and transmitted signals. Finally, after another stage of amplification and filtering, the signals are sampled by the ADC and the values are stored on a host computer. It stores one sample per frequency step, this equates to about 1 MS/s/ch, depending on the radar's current configuration. The low sampling rate is a consequence of the stepped-frequency radar architecture.

The receiver mixes to a "high" IF which is well-above the operating frequency band; mixing in this fashion allows unwanted mixing artifacts (e.g., harmonics, leakage, and intermodulation products) to be easily filtered while allowing the wanted signal to propagate without excessive attenuation. The next stages resemble a typical super-heterodyne architecture, where the wanted signal is mixed to an IF close to baseband, filtered, and then finally mixed to baseband in-phase/quadrature (I/Q). The baseband I/Q signals are then digitized; they can now be processed to form a radar image.

The receiver uses a digitally-stepped variable attenuator in the IF stage. The variable attenuator may be used in a list mode, which dictates the IF stage attenuation value as a function of frequency. The radar user can currently select the list values (i.e., attenuation values and frequency bands for each value). Typically, the receiver's variable IF attenuation will be set to a low value, so as to ensure low noise over its entire operating band. The receiver bandwidth is set by the IF stage filter's bandwidth because of its frequency response having the fastest roll-off (compared to all of the other filters used in the receiver).

After each frequency is either transmitted and received, or excised, an Inverse Fourier Transform (IFT) is performed which transforms the data from the frequency domain to the range (or time) domain. A single pulse (at one frequency) would result in a range resolution of $c\tau/2$, where c is the speed of light and $\tau$ is the pulse width. With N stepped frequencies, the range resolution is improved to $c\tau/2N$. The previous statement assumes that $\tau\Delta f$ is chosen to be unity, where $\Delta f$ is the frequency step-size. The range resolution can be explicitly expressed as $c\tau/2\tau\Delta fN$.

The output of the mixed received signal is fed to an ADC, further signal processing performed using one or more processors (e.g., Processor1 and Processor2) and then a radar image is output. The one or more processors are configured to execute the novel processing depicted in FIG. 3 and its description below. One system embodiment comprises three major components: (i) a spectrally agile radar, (ii) a processor that uses knowledge of a "spectrally notched" target response to eliminate downrange sidelobes using a modified version of the CLEAN algorithm, and (iii) a processor that implements a modified version of recursive sidelobe minimization (RSM) to further reduce image sidelobes. The spectrally agile radar is able to excise frequency bands within a larger operational band in an effort to avoid radio frequency interference (either causing it or being adversely affected by it). The first processor uses a priori knowledge about the notching pattern to mitigate the downrange sidelobes introduced by the notching procedure. The second processor reduces cross-range sidelobes most effectively. The three parts of the process operate on the radar data in the order in which they are presented. In particular, the RSM processor is the final processing element (i.e., the order of in which the processing steps are performed is critical).

FIG. 1B shows an example of the receiver mixing scheme for the stepped-frequency radar in FIG. 1A. The "Frequency Mapping Overview" diagram (at the top) depicts each frequency or frequency band at which the received signal eventually occupies. Arrows depict narrowband signals, while semicircles depict frequency bandwidths. The receive signal frequency locations, the local oscillators (LOs) that are used in the receiver mixing stages, and the resulting image frequencies which are byproducts of the mixing stages are shown. The gray rectangular mask applied represents the frequencies that were attenuated (notched).

The frequency of the signal at the front-end of the receiver is the current radar operating frequency, $F_o$, after a filtering and amplifying stage, the signal is then mixed with $LO_{STEP}$ (Step 1). $LO_{STEP}$ is tuned in sync with the stepping of the operating frequency (i.e., the operating frequency and $LO_{STEP}$ have a constant frequency offset). This results in the entire bandwidth being mapped into a single narrowband IF, $IF_{HIGH}$. After another stage of amplification and filtering, the $IF_{HIGH}$ signal is mixed with $LO_{HIGH}$ (Step 2). The resulting signal is $IF_{LOW}$, which again is amplified and filtered. This stage also has a variable attenuator, which is used as an automatic gain control and has potential for future cognitive capabilities.

Lastly, the signal is passed to an I/Q demodulator resulting in baseband I/Q signals, which are filtered and then sampled by an analog-to-digital converter ADC (Step 3). The complexity of the receiver mixing scheme allows for greater immunity to RFI. All intermodulation products (IMPs) from RFI within the operating band of the radar are suppressed more than 100 dBc except for the $f_{LO}-2f_{IF}$ (60 dBc) and $f_{LO}-3f_{IF}$ (80 dBc) (assuming an RFI power level equal to that of the wanted received signal). The $f_{LO}-2f_{IF}$ and $f_{LO}-3f_{IF}$ IMPs all result in frequencies below the system's $IF_{High}$ frequency for all operating frequencies; thus, a filter bank using high-pass filters could be implemented to reduce all IMPs to >100 dBc suppression. IMPs are denoted as $N \times f_{LO} \pm M \times f_{IF}$, where $f_{LO}$ and $f_{IF}$ are the LO frequency and IF, respectively. Since $IF_{HIGH}$ is higher than the operating frequency here, the mixer port designations are reversed from that of most receivers (i.e., the IF port leads to the antenna, and the RF port is the output of the mixing operation).

FIG. 1C is a diagram showing the timing of the radar system of FIG. 1A. The radar system is designed to have highly reconfigurable timing control. The end-user can select the transmit and receive on/off times. The timing control lines and digital data lines are output from a field-programmable gate array (FPGA). The timing control ultimately allows the user to dictate the radar range swath extent and location, receiver blanking distance, and receiver sample time.

The top 3 rows are pertinent to the system's frequency synthesizer (e.g., an AeroflexFS5000). "BCD Data" refers to 16 parallel binary coded decimal (BCD) lines that dictate the frequency that the frequency synthesizer is programmed to output.

There are four lines for each digit of the frequency content, i.e., four lines for each of the following: 1-, 10-, 100-, and 1000-MHz place. The "Strobe" is a digital timing control line that determines when the frequency synthesizer should switch to the current frequency held on the BCD data lines. The frequency synthesizer switches the output frequency to that of the BCD line data 20 ns after the strobe is set to "low". This is shown in the third row from the top.

The bottom four rows relate to the transmit and receive switches, and their corresponding control signals. The transmitter switches determine the pulse width, which can be varied between 200 ns and 2 μs. In addition, they are also used to switch between left and right transmit antennas. The receive switches are used to terminate the direct coupling signal as well as high energy echoes from close-in to the radar, which can produce saturation and ringing in the receiver front-end. The variable delay between Tx "Off" and Rx "On" is used to control the amount of receiver blanking, i.e., the distance to the initial range bin. The transmit switches have a 20-ns switching delay after a change in the control signal state. Similarly, the receive switches have a 20-ns switching delay.

The non-limiting example here shows a transmit duration of 500 ns and receive duration of 50 ns, with a 20-ns receiver blanking duration (which corresponds to ~10 ft of blanking radius).

Although the system is capable of switching the transmit and receive channels with great precision, special care must be taken to ensure that the received signals are digitized after switching transients have subdued. Only one sample is digitized during each frequency-step. The user can vary the sample time within the Rx "On" duration, and sampling time with 8.33-ns precision.

The frequency synthesizer updates the operating frequency on the falling edge of the strobe. There is a 150-ns minimum time lag between when the BCD lines are changed and when the strobe line can be sent. The BCD data change when the Tx switch is switched "On", and the strobe line switches "low" when the receiver is switched "Off", which ensures that the 150-ns minimum is always met (even when the system is configured for a pulse width of 200 ns). The RF output of the frequency synthesizer is not valid for another 20 ns after the strobe is sent. The transmitter switches determine the pulse width that the radar is operating at, and can be varied between 200 ns and 1 μs. In addition, they are also used to switch between transmit antennas. The transmitter switches have a typical switching time of 45 ns, and receiver switches have a typical switching time of 20 ns (seen between the Tx/Rx control and hardware timing diagrams). Therefore a 37.5-ns delay in the control lines equates to 12.5-ns delay between the transmit 'off' and receive 'on' position. This equates to a round-trip propagation delay of ~6.5 ft. (~2 m). The analog sample is taken during the next 37.5 ns; again the receive switch also takes 20 ns to turn off (from when the switch is triggered), so the range swath can essentially be shifted between 6.5 ft. (~2 m) and 20 ft. (~6 m) away from the radar.

Figure 2A:
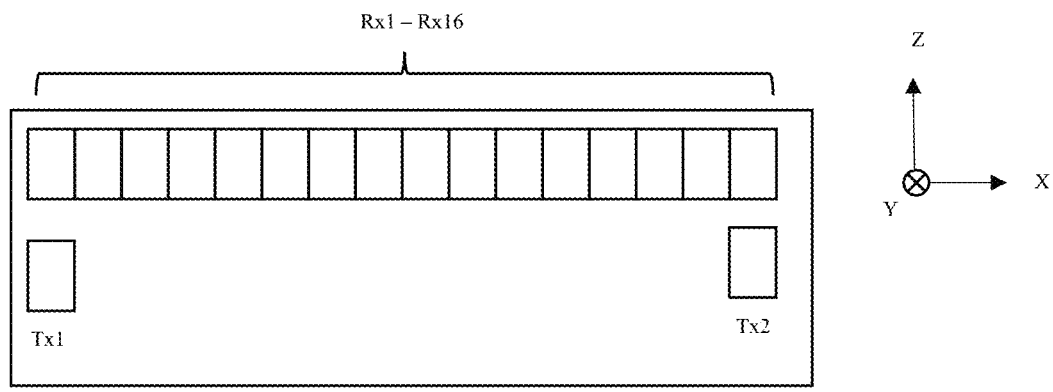
FIG. 2A shows a real radar array according which may be used with the radar system according to an embodiment.

The radar system may be implemented using a real radar array or synthetic aperture radar. FIG. 2A shows a real radar array according to an embodiment. The orientation is side-looking, e.g., looking in the −Y direction. The linear array is composed of a plurality of uniformly spaced receiver antennas Rx. As shown there are 16 Rx antennas nominally labelled Rx1 to Rx16, but this number is non-limiting. Two transmitter antennas Tx are shown underneath the first and last Rx antennas in the array, but this is a non-limiting. One transmitter antenna could be used, and their position in reference to the Rx antenna array could be altered. The radar system is suitably controlled so as to receive data from all of the receiver antennas Rx1-Rx16 at the same time. FIG. 1A is a simplification of the radar architecture for clarity of the stages in the transmitter and receiver. There are many components not shown here, including a switch in the transmitter chain before the power amplifier that feeds two power amplifiers and then either the left or right antenna. The receiver chain depicted in FIG. 1A is replicated 16 times for the SAFIRE system, but the number of receiver channels in non-limiting.

Figure 2B:
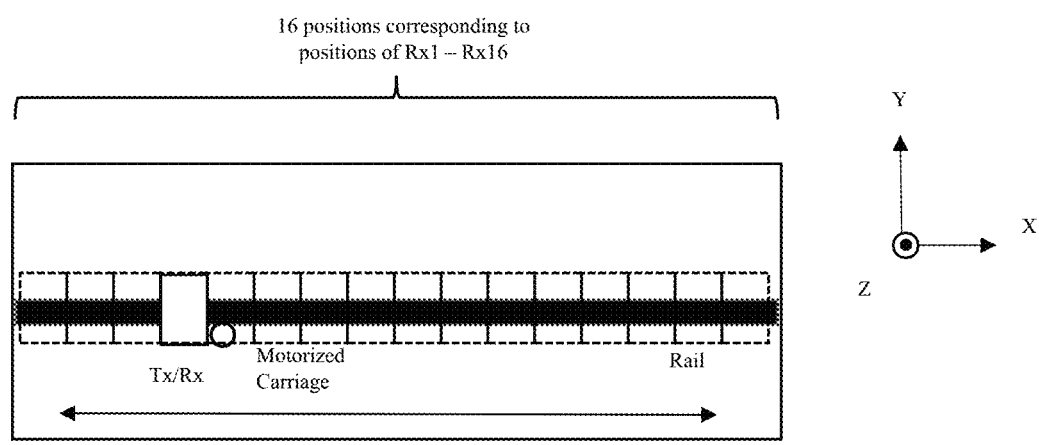
FIG. 2B shows a corresponding synthetic aperture radar (SAR) embodiment.

FIG. 2B shows a corresponding synthetic aperture radar (SAR) embodiment. The orientation is downward looking, e.g., looking from the Z-direction toward the X-Y plane. In one manifestation of SAR, a transmitter antenna, Tx, and a receiver antenna, Rx, are located on a moveable carriage that translates in 1-D. For instance, the carriage is driven by a motor which translates along a rail. There are 16 locations which correspond to the receiver antenna location in the radar array in FIG. 2A. The radar system is suitably controlled so as to receive data from all of the receiver Rx to collect data at each of the 16 positions. It thus provides equivalent spatial sampling as a real antenna array.

A transmitter and receiver antenna pair is defined by any combination of transmitter and receiver antenna locations, within either a real- or synthetic-aperture. In FIG. 2A, for the real aperture, one pair is represented by Tx1/Rx1 and another pair is represented by Tx2/Rx3 as examples. For a synthetic aperture, the transmitter/receiver antenna pairs are dictated by the sampling locations. As depicted in FIG. 2B, the transmitter/receiver pair location is shown at Tx4/Rx4. In various embodiments, real and synthetic apertures may be combined to increase the number of transmitter/receiver antenna pairs.

Novel Signal Processing Methodology.

Figure 3:
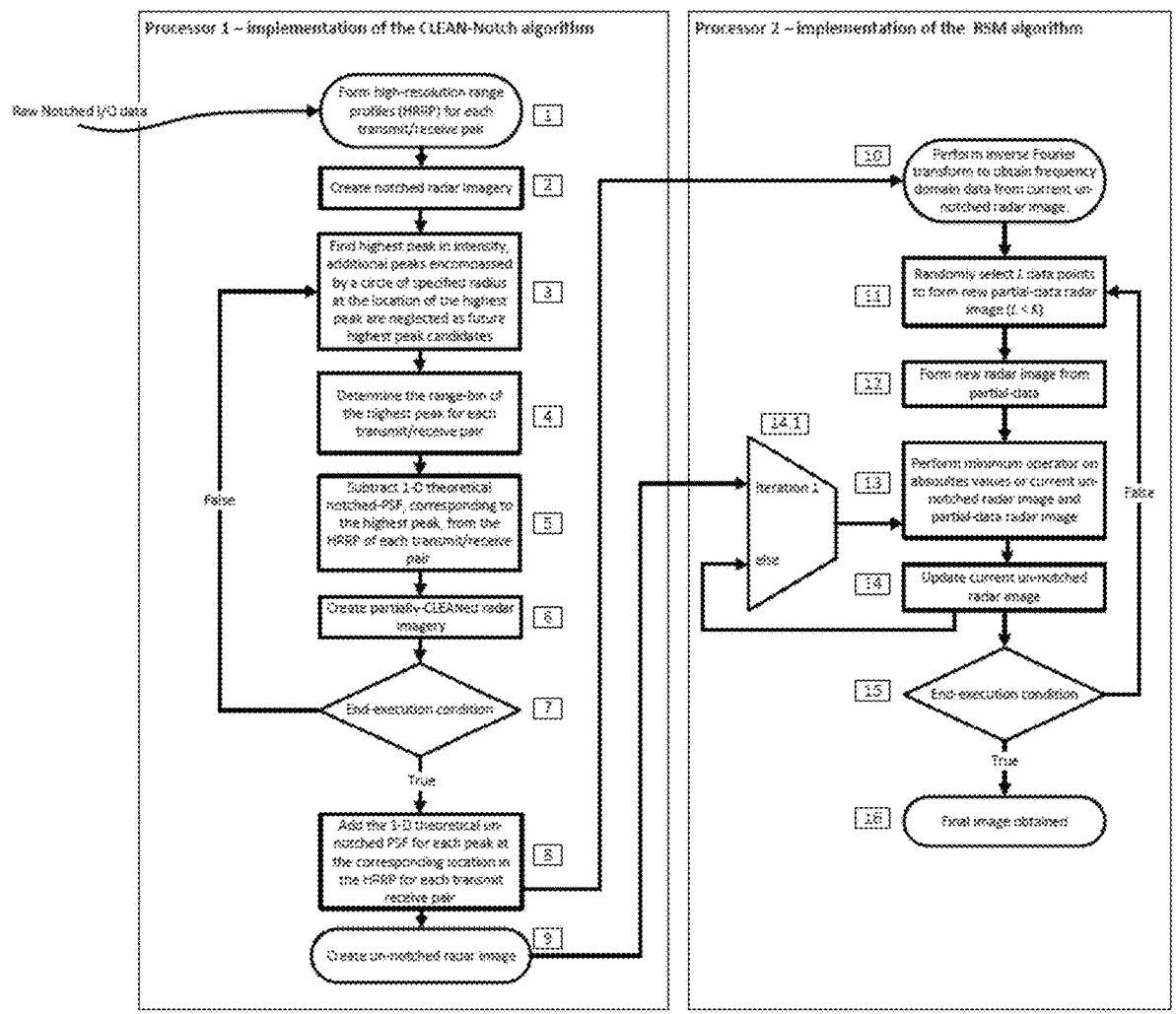
FIG. 3 is a block diagram of the novel radar signal processing according to embodiments of the present invention.

FIG. 3 is a block diagram of the novel radar signal processing according to embodiments of the present invention.

Our adaptation/reformulation of the CLEAN algorithm uses a notched version of the received signal to eliminate many of the downrange sidelobes referred to herein as "CLEAN-Notch." This represents a fundamental departure from the original CLEAN algorithm that assumes an un-notched response has been received. Also, when CLEAN is adapted for RFI removal, it is typically assumed that a contiguous frequency band is being used. We have intentionally introduced artifacts through the notching that we then attempt to remove.

In the block diagram of FIG. 3, method is depicted as being performed by two processors: Processor 1 for the performing the CLEAN-Notch processing subroutine and Processor 2 for the RSM processing subroutine. Together they operate to perform steps #1-16 of the method as shown and described. As further noted below this processing configuration is non-limiting.

This method may be summarized as follows:
1. initially receiving radar data having frequency-domain notching in which select data at pre-determined frequency bands has been excised;
2. performing the CLEAN-Notch processing (steps #1-9): In brief, these steps de-convolve the notched target responses from estimated target locations, and insert the theoretical un-notched target responses at the estimated target locations;
3. subsequently performing a recursive sidelobe minimization processing (steps #10-15); and
4. outputting an improved radar image which has a reduction in artifacts caused by frequency-domain notching (step #16).

At the start of the method, complex (i.e., I/Q) raw radar data may be used as an input to the processing as depicted in FIG. 3. Although, it will be appreciated that the input radar data may also be real rather than the complex (i.e., I/Q) data. In this case, the quadrature data can be created from the real data via a Hilbert transform for instance.

In step #1, we form notched high-resolution range profiles (HRRP) for each transmitter and receiver antenna pair from the notched radar data. There are a (notched) set of frequency domain samples for each transmit/receive antenna pair input. The smallest interval between frequency domain samples is $\Delta f$ Hz, which is denoted as the frequency step-size. The frequency step-size dictates the unambiguous range (distance), governed by the following equation, $\Delta R = c/2\Delta f$, where c is the speed of light. For example, a desired 1 km unambiguous range swath would require a frequency step-size of 150 KHz. High-resolution range profiles (HRRPs) are obtained by transforming the frequency domain samples to the time domain via an Inverse Fourier transform (IFT) as known in the art. The HRRP is a one-dimensional signature of an object. It is a representation of the time domain response of the target to a high-range resolution radar pulse.

The range profile x[n] for a point target at range R is given by the following equation:

$$x[n] = \frac{1}{N} \cdot e^{\left(-j\frac{4\pi f_0 m \Delta R}{c}\right)} \cdot e^{\left[j\pi\left(n - \frac{2mN\Delta f \Delta R}{c}\right)\left(1-\frac{1}{N}\right)\right]} \cdot \frac{\sin\left[\pi\left(n - \frac{2mN\Delta f \Delta R}{c}\right)\right]}{\sin\left[\pi\left(\frac{n}{N} - \frac{2m\Delta f \Delta R}{c}\right)\right]} \quad (1)$$

Here, n is the discrete spatial samples (range bins) of the HRRP, N is the number of frequency steps (and consequently, the number of range bins), and m is the range bin of the target. The equation is derived in Section 3.5.1 ("Range Resolution") of the Phelan PhD dissertation, and the reader is invited to consult it for further details.

For the notched frequency domain data, certain frequency samples will be set equal to zero. These omitted frequency samples introduce artifacts (i.e. unwanted sidelobes) in the HRRPs calculated from the notched frequency domain data.

Figure 5:
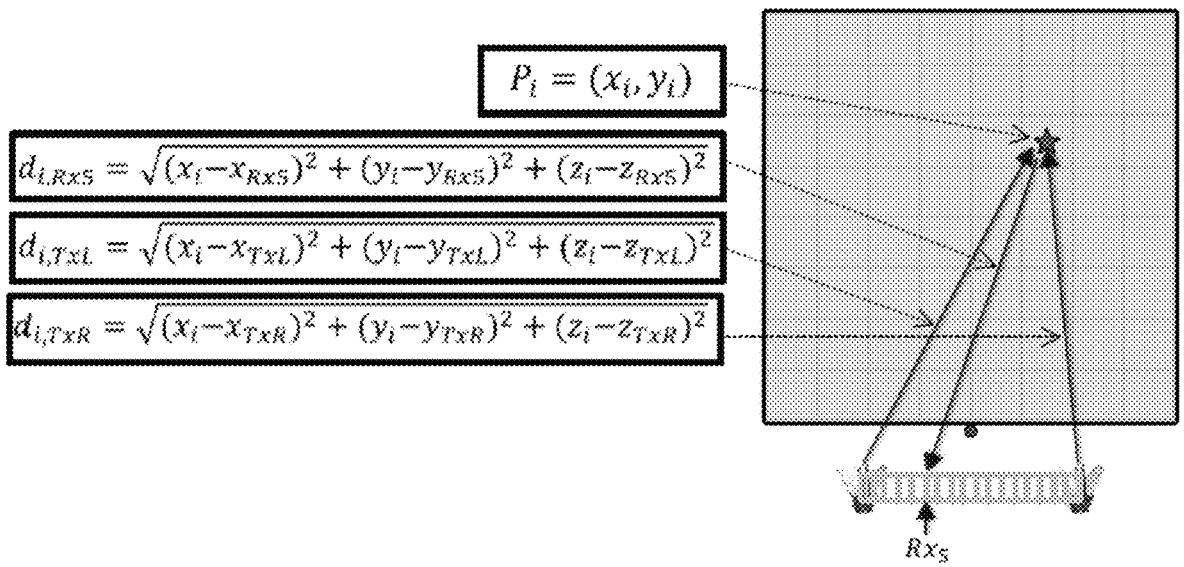
FIG. 5 shows an example of back projection pixel determination which can be used in certain steps of the method in FIG. 3.

In step #2, we form a notched-frequency radar image from the notched radar data. Once the HRRPs are calculated, a time-domain, back projection algorithm can be used to create a "notched radar image". FIG. 5 and its description, below, show an example of back projection. It is noted that other image formation algorithms could also be used, and these algorithms may require the notched frequency domain data as inputs (not the HRRPs). For example, the Polar Format algorithm—an image formation algorithm often employed by state-of-the-art systems—creates the final SAR image via a 2-D FFT of the frequency domain data. See e.g., W. G. Carrara, R. S. Goodman, R. M. Majewski, "Spotlight Synthetic Aperture Radar Signal Processing Algorithms," ©1995, Artech House, Norwood, Mass., Chapter 3, pages 88-109, herein incorporated by reference.

In step #3, we determine a peak in intensity above a specified threshold in the notched-frequency radar image. For instance, we locate the highest-intensity pixel within the notched radar image. In order to avoid using multiple pixels from the same target, eliminate pixels within a specified distance of the current peak from future consideration. The specified masking distance is dependent on the desired target set, the pixel resolution, and the degree of notching on the data set. A non-limiting illustrative distance could be a 1-m radius. Of course, this parameter is dependent on the radar resolution as well as the target type.

In step #4, we calculate the two-way distance to the location of the peak for each transmitter and receiver antenna pair combination. Since the particular pixel selected from the notched radar image in step #3 is at a known location (relative to the radar), it is possible to calculate the two-way distance to this pixel for each transmitter/receiver antenna pair. After determining this distance, calculate the corresponding range gate number (index) within each HRRP corresponding to the two-way distance for each transmitter/receiver pair. For instance, a coordinate grid may be defined on the ground corresponding to the image pixel locations. For instance, the coordinates may be of Universal Transverse Mercator (UTM) coordinates. The coordinates of all Tx and Rx antenna locations in relation to the target scene are known a priori.

Next in step #5, we subtract a 1-dimensional (1-D) theoretical notched point spread function (PSF), corresponding to the peak from the corresponding HRRP for each transmitter and receiver antenna pair combination. The range profile for a point target at range R may be calculated according to equation (1), given above. This HRRP, or point target response, is designated the "point spread function" or PSF for the notched radar data, and it shows how the signature of a single point target is "spread" in space by the notched radar system. The point target response can be scaled in both magnitude and phase so that it matches the response in the notched radar image, if needed. This 1-D HRRP response is then subtracted from the measured response.

In step #6, a new, "partially-CLEANed" (CLEAN-Notched) image is created. This image is an image in which one (or more) of the targets has been removed (and subsequent targets can be removed in additional iterations).

At step #7, we check to see if an end-execution condition is met. This could be implemented, for example, by a peak-to-average-sidelobe ratio in the partially cleaned image or predetermined by the expected number of targets (running for a fixed number of iterations). The peak-to-average-sidelobe ratio would depend on a number of factors, mainly the expected return signal from a target, and the percentage of RF notching implemented. If the CLEAN process is completely successful then after the end-execution condition, the radar image will contain no significant targets. If the end-execution condition is false, the processing return to step #3 and subsequent steps.

In step #8, we add the 1-D theoretical un-notched PSF for each determined peak at the corresponding location for each transmitter and receiver antenna pair combination to obtain an un-notched radar image. For instance, we add the complex un-notched point target responses centered at the appropriate range bin for each Tx/Rx pair, found in step #5 to the CLEANed (CLEAN-Notched), notched radar data of step #6. It is noted that residual data measurements/noise (beneath the peak threshold, for example) will still remain. This produces the un-notched, time domain data (i.e., HRRPs) that will serve as input to processor 2 at step #10.

In step #9, we create an un-notched radar image. For instance, using a back projection (or equivalent image formation technique), we create the un-notched radar image that will serve as input to the current un-notched image for the initial iteration of the recursive sidelobe minimization (RSM) procedure performed by Processor 2. The image produced by the CLEAN-Notch processing section (i.e. after all of the distorted target responses have been removed and "pristine" responses re-inserted) should serve as the initial image for RSM processing. That is, the first random excisions are formed, a new image is created, and this image is compared to the output of the CLEAN-Notch algorithm. As usual, the image output by the "minimum" operation becomes the new baseline for comparison. That is, the low-resolution profiles that acted as inputs to the CLEAN-Notch algorithm (i.e., frequency domain data) serve as the set from which RSM selects its samples. The Low Range Radar (LRR) profiles for each Tx/Rx pair exist after applying the CLEAN-Notch processing. This is input at step #14.1 for iteration 1 of the RSM processing.

In step #10, we perform inverse Fourier transforms on the HRRPs to obtain frequency domain data from a current un-notched radar image, the IFT may be given by: $X(n)=K \sum_{m=0}^{N-1} x(m) e^{j2\pi mn/N}$, where $x(m)$ is the range sample from bin m, K is a scale factor, N is the number of range bins, and n is the frequency index. Specifically, we create the un-notched frequency domain samples from the time domain samples of step #8 via an inverse Fourier transform (IFT). These samples serve as an input to the image formation steps performed by Processor 2, for example.

Next, at step #11, we randomly select data points to form a new partial-data radar image. This may include randomly selecting a subset of frequency domain data samples from the collection of transmit/receive pairs, where L<K. Here, L is the number of frequency domain samples selected, and K=M×N is the total number of samples available, M=the number of transmit/receive pairs, and N=the number of frequency steps (i.e., the number of samples in the frequency domain). For a 16 antenna array (both real and SAR), as depicted in FIGS. 2A and 2B, M=16. N could be 1,000, for instance. With these exemplary values, L should be less than 16,000.

At step #12, we create a new radar image using only the subset of frequency domain data samples selected in #10. More particularly, the excised frequency domain samples are set equal to zero or nil. This causes the sidelobe pattern in the time domain to vary. This new image is referred to as the "partial data radar image" in subsequent steps.

At step #13, we perform a 'minimum' operation on the magnitudes of the partial data radar image and the current radar data image. If this is the first iteration, then the current un-notched radar image is set equal to the output image of step #9 in Processor 1, for example. Here the magnitude of the complex samples is calculated in the standard way represented by the formula: $|x|=\sqrt{real(x)^2+imaginary(x)^2}$, where $|x|$ denotes the magnitude (absolute value). The minimum operation produces an output image, wherein the pixel information of the output image at coordinate (m,n) equals the corresponding complex pixel information of the input image with smallest absolute value at coordinate (m,n). That is, if $I_{min}$ is the output image, $I_1$ is one input image, and $I_2$ is the second input image, then $I_{min}(m,n)=\min(I_1(m,n),I_2(m,n))$, where (m,n) denotes the image pixel coordinates. In this step, $I_1$ is the current un-notched radar image and $I_2$ is the partial-data radar image.

At step #14, the current un-notched radar image is set equal to the output of the minimum operation in step #13. For the first iteration, step #14.1 indicates the current un-notched radar image is simply the output image from step #9 in Processor 1. For all other iterations, step #14.1 indicates the current un-notched radar image is the output of step #14 (i.e., the result of the minimum operation).

At step #15, we check to see if the end condition is satisfied (e.g., a specified number of iterations has been reached or a defined image quality metric has been met), otherwise the process returns to step 11. If the condition is satisfied, then output the current un-notched radar image and terminate the process. For instance, the stop condition for the number of iterations may be equal to the number of targets.

In step #16, the final RFI-CLEANed radar image is complete and output. The final radar image may be a digital images formed of pixels. Gray-scale or color data can be associated with the individual pixels, based on intensity, for example, in which darker shades of gray (or darker colors) correspond to higher values.

The novel methodology according to embodiments may be executed by a suitable controller incorporated or otherwise operationally connected to the radar system. The controller may be configured to execute ordinary machine-executable instructions to control and operate the radar system in an ordinary manner. Not only for ordinary control, but the controller is further configured to execute machine-executable instructions to implement the novel methodology for enabling radar operation in a spectrally congested environment according to embodiments of the present invention. The controller may be implemented as hardware, software or a combination thereof specifically configured to execute code or instructions necessary to implement embodiments of the present invention. Machine-executable instructions (such as software or machine code) can be stored in a memory device (not shown) and will be executed by the controller as needed. In some implementations, software code (instructions), firmware, or the like, may be stored on a computer or machine-readable storage media. The controller may be comprised of one or more processor devices.

The machine-executable instructions may be part of the controller, although, it will be appreciated they could be executed by one or more distinct processors thereof or, in other implementations, by processors of distinct and separate controllers altogether.

As shown in FIG. 1A, there are two blocks, labelled "Processor 1" and "Processor 2", included in the radar system architecture. In this-non-limiting example, Processor 1 may be configured to execute instructions to perform processing steps associated with CLEAN-Notch processing, and Processor 2 may be configured to execute instructions to perform processing steps associated with RSM processing. Additional processors might also be provided. Alternatively, a single processor could be provided which is configured to operate in an analogous manner.

The processor(s) may be a programmable processor, such as, for example, a field-programmable gate array (FPGA) or an application-specific integrated circuit (ASIC) processor. The methodology disclosed herein may be implemented and executed by an application created using any number of programming routines. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

Up until this point, with reference to FIG. 3, RSM processing has been disclosed as being used after the CLEAN-Notch processing. As mentioned above, other nonlinear sidelobe-reduction algorithms may be used in other embodiments. For instance, as an alternative to RSM (steps #11-15 in FIG. 3), a procedure such as dual- or multi-apodization could be used instead, as described in H. C. Stanwitz, et al, "Nonlinear Apodization for Sidelobe Control in SAR Imagery," IEEE Transactions on Aerospace and Electronic Systems, vol. 31, No. 1, January, 1995, pp. 267-279, herein incorporated by reference. The dual-apodization creates two images using two different windowing techniques (e.g., a rectangular window and a Hanning window). It then compares the images and selects the complex pixel values from the image with the smallest absolute pixel values. The multi-apodization performs similar processing with additional windows (e.g., rectangular, Hanning, Chebyshev, Taylor). Since these techniques are non-iterative (i.e., the images are formed in parallel), steps analogous to steps 14.1 and 15 are not required.

Notching. Notching is the process of eliminating certain frequency bands from the otherwise continuous operating frequency band of an RF system. Two cases which would promote notching data, include: (1) to avoid bands in which RFI will affect radar imagery (e.g., above a predetermined noise threshold); and/or (2) to avoid bands which are regulated by the Federal Communications Commission (FCC), the National Telecommunications and Information Administration (NTIA), etc. The resulting radar imagery will have bands of frequencies over the operating bandwidth where no data are available. These absent data points are referred to as "notched" frequencies.

Figure 4A:
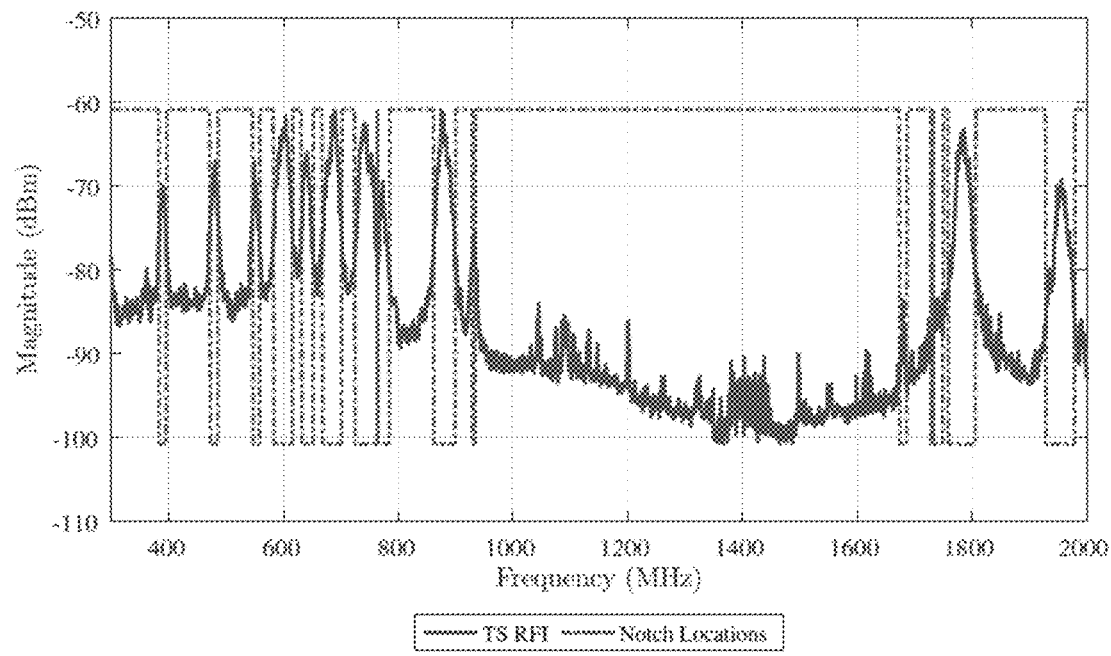
FIG. 4A shows an experimental RF spectrum subject to notching to remove bands where RFI is present.

FIG. 4A shows experimental RF spectrum subject to notching to remove bands where RFI is present. In this example approximately 21% of entire spectrum has interference and will be notched. It may be 14% effective notching with a Hanning window applied over the frequency domain data.

Figure 4B:
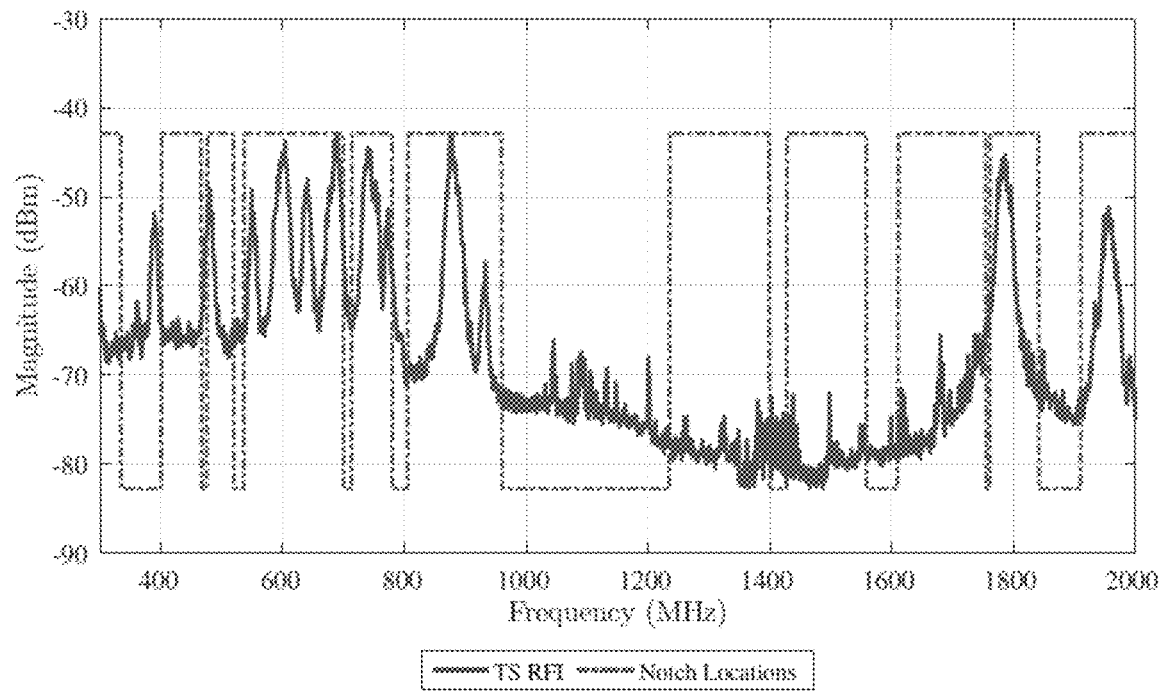
FIG. 4B show typical notching due to regulation of the RF spectrum.

FIG. 4B show typical notching due to regulation of the RF spectrum. Here, approximately 33% of entire spectrum is notched. This corresponds to 41% effective notching with the application of a Hanning window.

A few key observations regarding notching can be made: (1) when the notch is located at the beginning or end of the operating band, it essentially equates to a decrease in overall bandwidth, thus reducing the resulting downrange resolution in the range profile; (2) a notch placed at the beginning of the operating band will result in an identical range profile magnitude as a notch with the same extent placed at the end of the range profile (however, they would have different phases); and (3) notches placed in the middle of the band actually produce a narrower mainlobe than the mainlobe that results from the full-band, but the sidelobes are dramatically increased, to the point where many sidelobe peaks are nearly the same magnitude (e.g., within 3 dB) of the mainlobe peak.

Figure 4C:
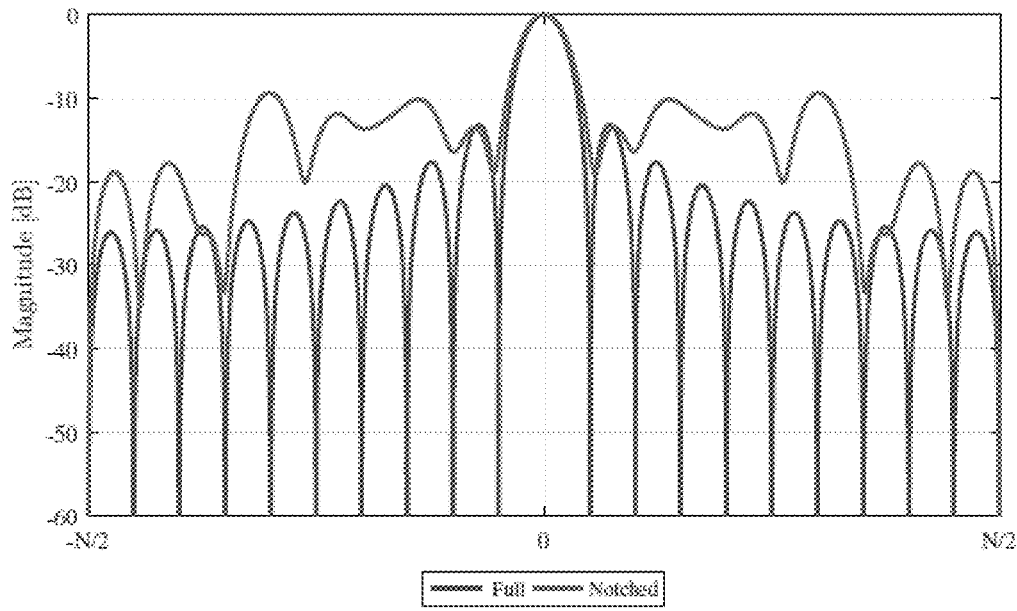
FIG. 4C is a comparison between notched and full-banded range profiles. The range profiles shown have been normalized to show relative sidelobe levels.

Notching in the frequency domain introduces sidelobe artifacts in the time domain (i.e., radar imagery degraded). The negative impact of frequency notching on a noise radar system was investigated in R. M. Narayanan, "Radar imaging using spectrally fragmented ultrawideband (UWB) noise waveforms," in Proc. 14th AFOSR Electromagnetics Workshop, San Antonio, Tex., January 2003, pp. P4-P5 for noise radar imagery. FIG. 4C is a comparison between notched and full-banded range profiles. The range profiles shown have been normalized to show relative sidelobe levels. There is a serious degradation (increased amplitude) in sidelobe levels of the range profile as compared to the unnotched range profile. This degradation results in artifacts in the formed radar imagery.

Back Projection.

FIG. 5 shows an example of back projection pixel determination used in steps #2 and #9 of the method in FIG. 3. The back projection algorithm was introduced in J. McCorkle and L. Nguyen, "Focusing of dispersive targets using synthetic aperture radar," Adelphi, Md., Tech. Rep. ARL-TR-305, August 1994, herein incorporated by reference. Details for forward-looking radar geometry in L. Nguyen, "Signal and image processing algorithms for the U.S. Army Research Laboratory ultra-wideband (UWB) synchronous impulse reconstruction (SIRE) radar," The Army Research Laboratory, Adelphi, Md., Tech. Rep. ARL-TR-4784, April 2009, herein incorporated by reference, which can be used to process the SAFIRE radar imagery. Each transmitter and receiver antenna location is determined with respect to the origin (0, 0, 0) indicated by a small dot. The target in this example is identified by a small star. After the pixel coordinates are defined, the round-trip time (or range) can be determined for each transmit-receive pair for each pixel. For the example shown here, the pixel grid lies within the x-y plane, and all z-components of the pixel coordinates are zero. However, the back projection algorithm can be easily converted to use voxels and extended into the third dimension as disclosed in the aforementioned the Nguyen technical report. The value at back projection pixel $P_i$ is given as:

$$P_i = \sum_{k=1}^{K} w_k s'_k(d_{i,k}) \quad (2)$$

where K is the number of transmit/receive pairs, $w_k$ is a weight factor, $s'_k$ is the $k^{th}$ range profile (with an $R^2$ amplitude adjustment), and $d_{i,k}$ is the round trip time from the transmit antenna from the $k^{th}$ transmit/receive pair to the $i^{th}$ pixel and back to the receive antenna from the kth transmit/receive pair. The round trip distance for the $i^{th}$ pixel and $k^{th}$ transmit/receive pair is given as:

$$d_{i,k} = d_{i,Txk} + d_{i,Rx,k} \quad (3)$$

Using the Pythagorean theorem, the two legs of the trip can be individually determined. Thus, $d_{i,k}$ is equal to:

$$d_{i,k} = \sqrt{(x_i - x_{Tx_k})^2 + (y_i - y_{Tx_k})^2 + (z_i - z_{Tx_k})^2} + \sqrt{(x_i - x_{Rx_k})^2 + (y_i - y_{Rx_k})^2 + (z_i - z_{Rx_k})^2} \quad (4)$$

where $d_{Tx,k}$ and $d_{Rx,k}$ are the distance from the $i^{th}$ pixel to the $k^{th}$ transmit/receive pair transmitter and receiver, respectively.

Results.

Figure 6:
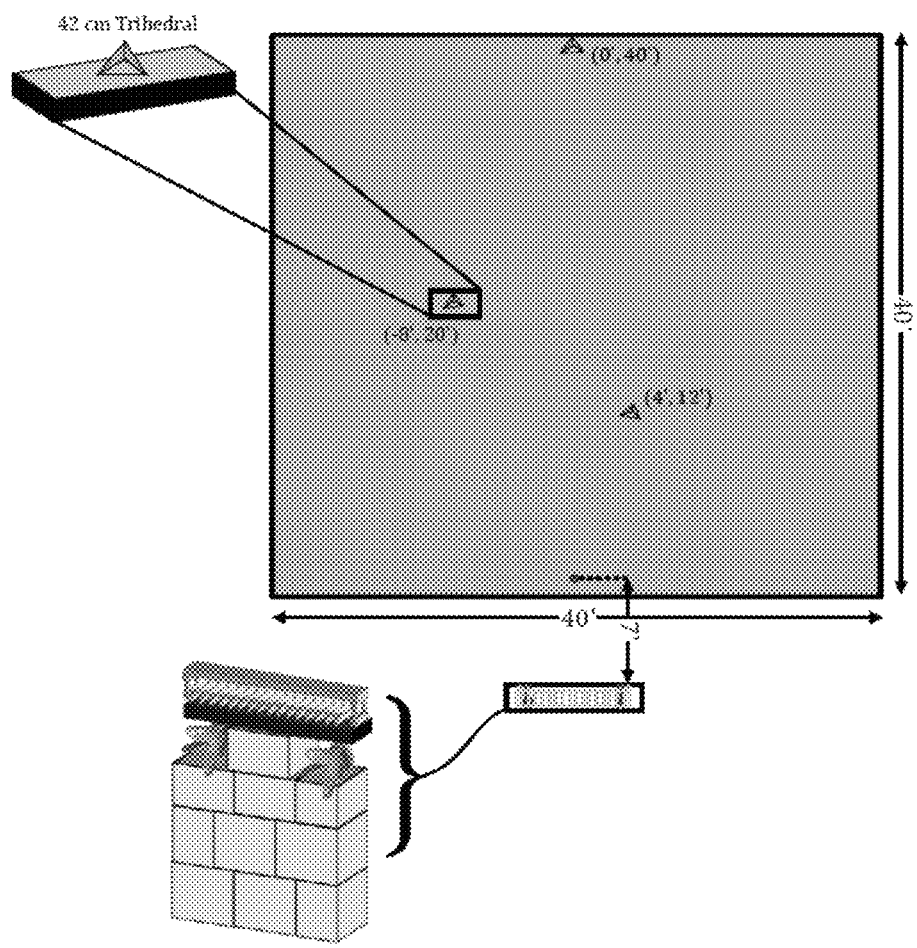
FIG. 6 is a schematic of the sand pit testing used for experiments.

Various experiments were conducted at the sand pit testing facility at the U.S. Army Research Laboratory in Adelphi, Md. The sand pit consists of a 40'×40' (12.19 m×12.19 m) test bed covered in sand for radar testing. The test radar system was located at origin (0, 0). The test targets consisted of a 86-cm trihedral (or corner reflector) constructed from a metallic mesh and two 42-cm trihedrals constructed from a solid aluminum sheet located at (4', 12') or (1.21 m, 3.66 m) and (−8', 20') or (−2.43 m, 6.10 m). The corner target at (20', 40') or (2.43 m, 6.86 m) was used for calibration and is not shown in the radar imagery. This arrangement of the sand pit is depicted in FIG. 6.

The raw data was notched with a −35 dBm threshold where RFI was present, and un-windowed. The same system was used to conduct the CLEAN-Notch algorithm, RSM algorithm, and two example implementations of the novel signal processing of the present invention on notched radar data. FIG. 7A, FIG. 7B, FIG. 9A and FIG. 9B show the processing with results of the experiments.

CLEAN-Notch Algorithm Processing with Results.

The CLEAN algorithm is an iterative technique that de-convolves the corrupted radar image with an estimate of the corrupted PSF at the highest peak, essentially removing the largest scatterer from the scene, along with its sidelobe artifacts. This process is repeated until the appropriate number of peaks have been removed or the highest amplitude peaks of the image fall below an assigned threshold.

In general, the CLEAN algorithm assumes that the radar image is made up of discrete point scatterers, and therefore is most useful for radar images consisting of manmade targets on the order of a range-resolution cell. The CLEAN algorithm used for the SAFIRE radar imagery was separately applied to the 1-D range profiles for each transmit/receive pair. The "cleaned" range profiles are then back projected to produce a 2-D radar image. Application of CLEAN-Notch to each transmit/receive pair eliminated the need to develop a 2-D point spread function, and since the back projection technique is a linear process, the end result is equivalent.

The CLEAN-Notch processing employed here was derived from that set forth in: J. Tsao and B. Steinberg, "Reduction of Sidelobe and Speckle Artifacts in Microwave Imaging: the CLEAN Technique," IEEE Transactions on Antennas and Propagation, vol. 36, no. 4, April 1988, herein incorporated by reference. The application of the algorithm disclosed in this paper did not operate on notched radar data.

Figure 7A:
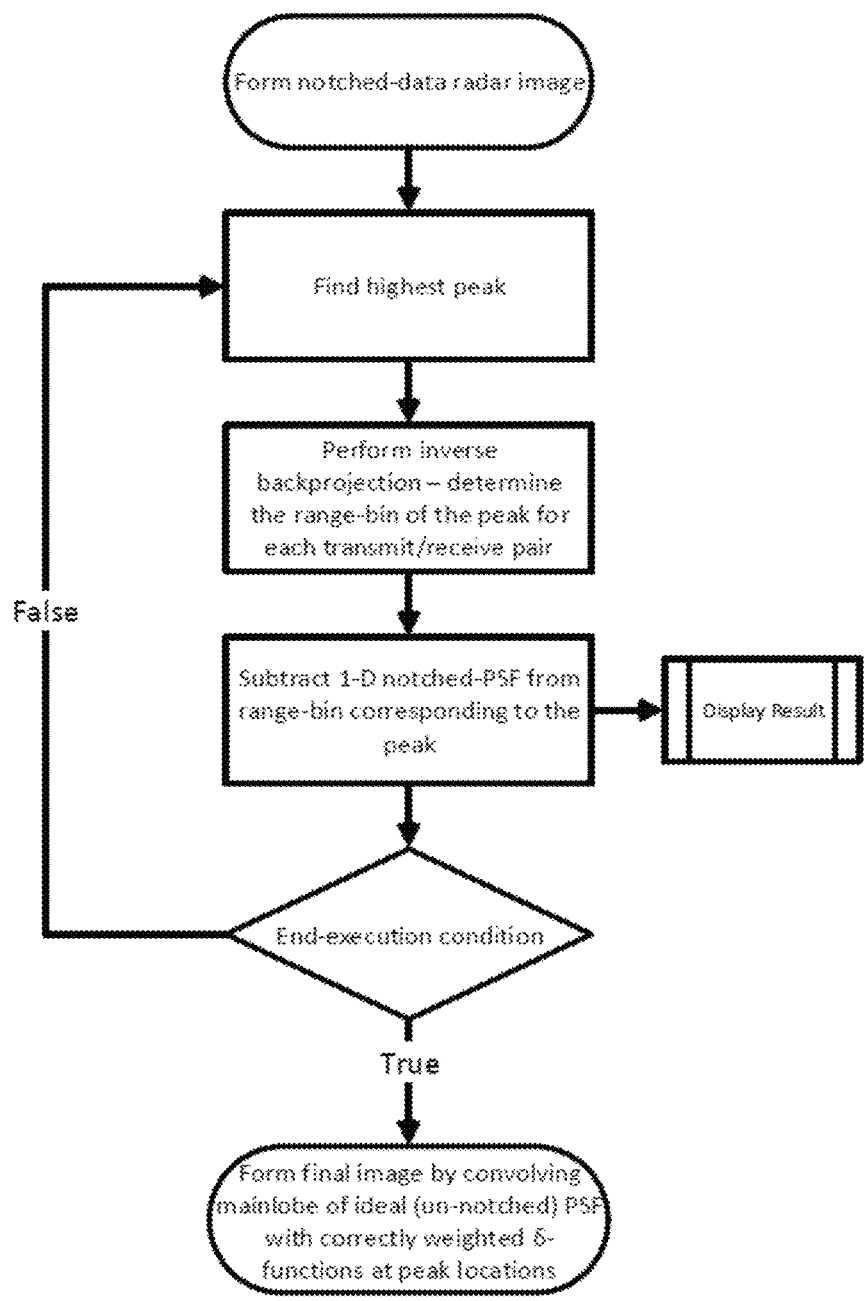
FIG. 7A is a flowchart showing the CLEAN-Notch algorithm applied during the experimentation.

The CLEAN-Notch algorithm applied during the experimentation is displayed in the flowchart in FIG. 7A. It includes the following steps:

1. Determine the highest peak from the radar image.
2. Determine the location and amplitude of the peak in the interpolated high resolution range profile for each transmit/receive pair (inverse of back projection).
3. Construct an array of zeros with length equal to the interpolated high resolution range profile.
4. Add a "1" to the zeros array at the peak location for each transmit/receive pair range profile.
5. Apply a Fourier transform to convert the ideal point target response to the frequency domain.
6. Limit the spectrum to the appropriate operating frequencies, and apply the same notching map that was used to obtain the initial radar imagery.
7. Convert back to the range domain via zero-padding and an inverse Fourier transform.
8. Coherently subtract the ideal notched range profile from each transmit/receive pair range profile.
9. Apply backprojection to recreate the partially "cleaned" radar imagery.
10. Repeat steps 1-9 until the assigned number of peaks have been deconvolved or the remaining peaks are below an assigned threshold.
11. Reconstruct the radar image by adding the ideal non-notched target responses to the "cleaned" data using the peak locations and amplitudes found in step 2.

Figure 7B:
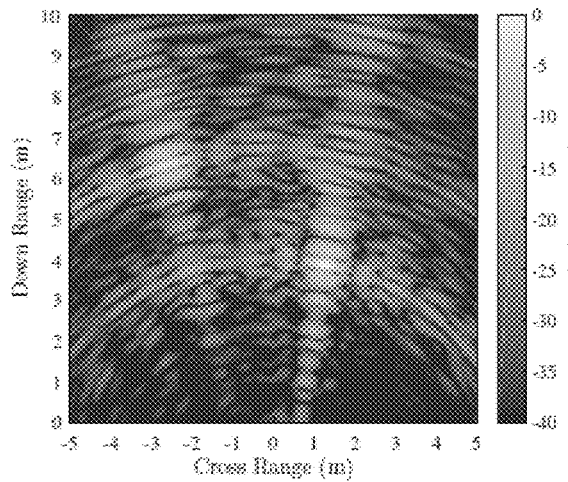
FIG. 7B shows results of the CLEAN-Notch processing performed.
Figure 7B:
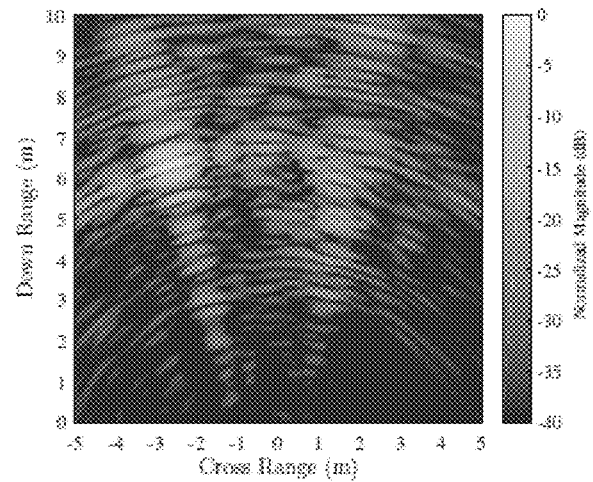
Figure 7B:
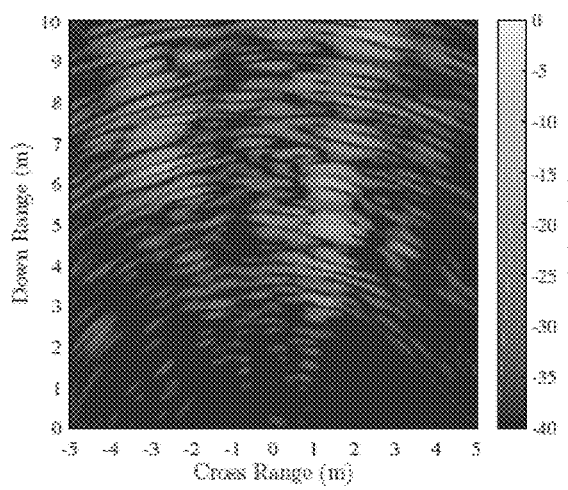
Figure 7B:
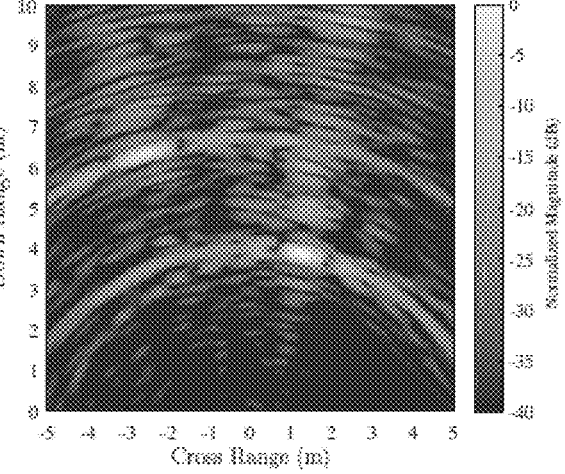

FIG. 7B shows results of the CLEAN-Notch processing performed. Image (a) shows the original notched radar image ("Un-CLEANed" image) before the CLEAN-Notch processing. Image (b) shows the resulting image with the first target (highest peak) removed. Image (c) shows the resulting image with the second target removed and the residual. A great deal of artifacts remain. Image (d) shows the CLEANed (CLEAN-Notched) image with ideal target responses added back to the residual.

Frequency-domain calibration is needed for the CLEAN-Notch algorithm, because the ideal and notched range-profile need to be estimated with high-accuracy. However, forcing the calibration terms to create an ideal point target results in an increase in sidelobe artifacts for a distributed target. Therefore the initial imagery is plagued by higher sidelobe levels. It is clear that sidelobes in the down-range direction (which are due to notching) are more greatly reduced by the CLEAN-Notch algorithm. For instance, it has been found that the CLEAN-Notch algorithm is effective when large fraction (e.g., 40%-effective shown here) of frequency-band is notched. However, CLEAN-Notch does not remove sidelobes due to system errors, clutter, or cross-range spread which are not created from notching.

Recursive Sidelobe Minimization (RSM) Processing with Results.

The U.S. Army Research Laboratory (ARL) previously developed a recursive sidelobe minimization (RSM) technique, which was later patented. See U.S. Pat. No. 7,796,829, herein incorporated by reference. The RSM technique aims to suppress sidelobe artifacts in radar imagery by applying a minimization operator over images formed after randomly excising aperture locations within a given data set. The RSM technique, used herein was based upon '829 patent and relies on two fundamental principles:

1. The main target responses (mainlobes) are unaffected by the act of randomly excising data points.

2. The sidelobe artifacts change location and amplitude when data points are excised.

Since the sidelobe peaks and nulls change location and amplitude with each iteration, applying a minimization operator results in a reduction of peak sidelobe level and a preservation of both the peak level and the location of target responses.

Figure 8A:
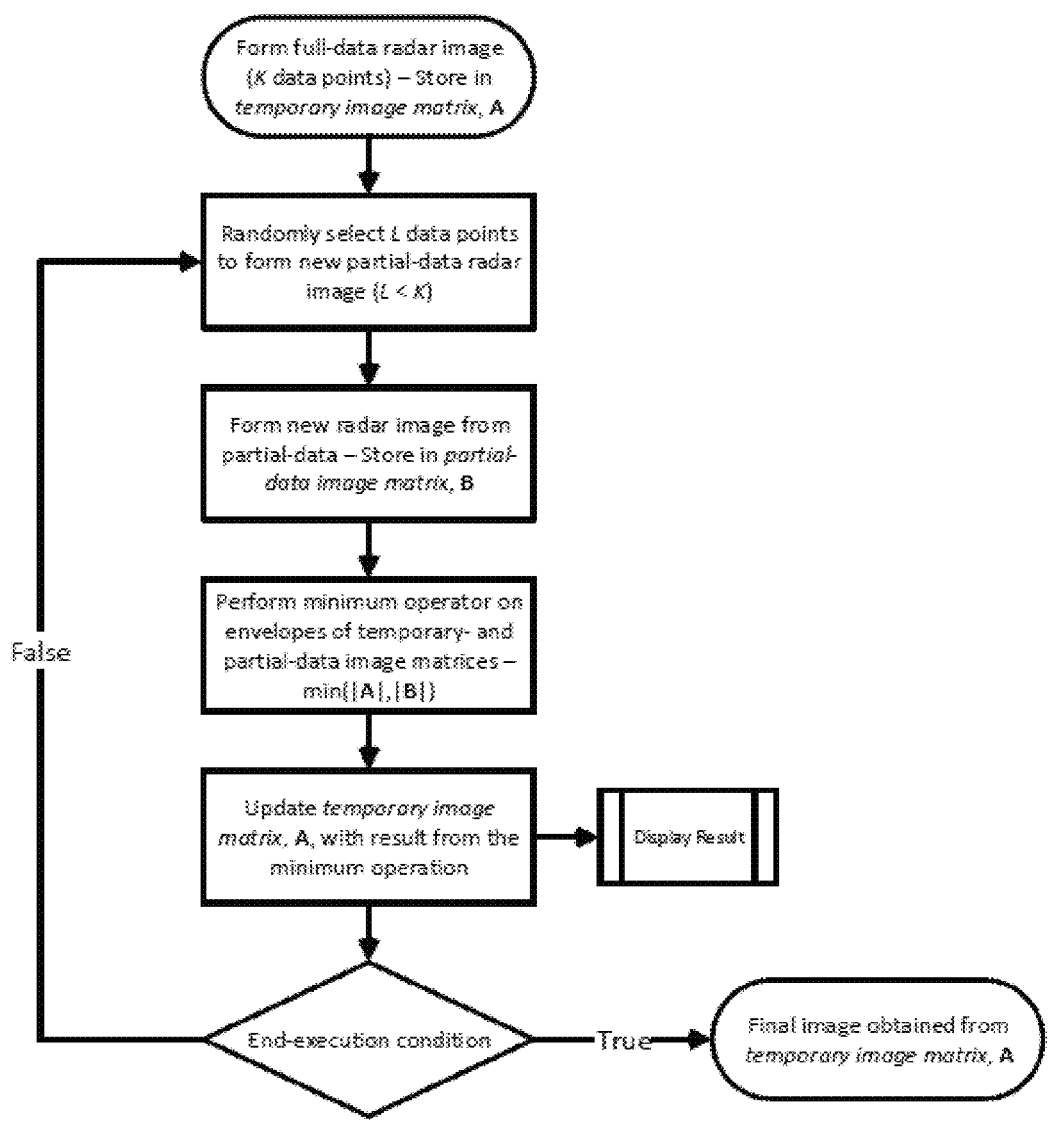
FIG. 8A is a flowchart showing the RSM technique applied during experiments.

The RSM technique is depicted in the flowchart shown in FIG. 8A. The technique is initialized with the formation of a radar image using the full dataset available, the image is then stored in the temporary image matrix, A. A subset of data points are randomly selected (the remaining data points are discarded until the next iteration) and they are used to form a partial-data image, which is subsequently stored in partial-data image matrix, B. The complex number corresponding to the minimum of the envelopes of A(i, j) and B(i, j) is then stored in A(i, j) for each pixel coordinate, (i, j). The minimization result merely dictates which matrix's pixel value had a lower envelope value. The result used to update the temporary image matrix is the complex-valued pixel from that matrix. An end-execution condition is checked, and either the next iteration is formed or the algorithm is halted. The end-execution condition is dependent on the RSM application (e.g., the algorithm could be halted after a pre-determined number of iterations or when a peak-to-sidelobe ratio criteria is met, etc.).

The selection of partial-data to be used within in the algorithm may be arbitrary, because the RSM technique can be applied to more than one domain (frequency or aperture position). As long as the two aforementioned conditions are met, RSM will result in a reduction in sidelobe levels.

The data were collected in the "listen-only" mode, which sweeps the receiver operating frequency but does not transmit during the process. The maximum power level was taken over each frequency and over all antennas and all sweeps. The receiver gain, and IF-stage attenuator setting were taken into account so that the RFI could be plotted in absolute power (dBm). A notching threshold was set 3 dB above the average RFI power level, any frequency bands above this level were notched. The total amount of the spectrum equated to ~21% of the total operating band, however, since most of the notching occurred at the beginning and end of the operating band, and since a Hanning window was applied to the data, the equivalent notching percentage is ~13.8%.

Figure 8B:
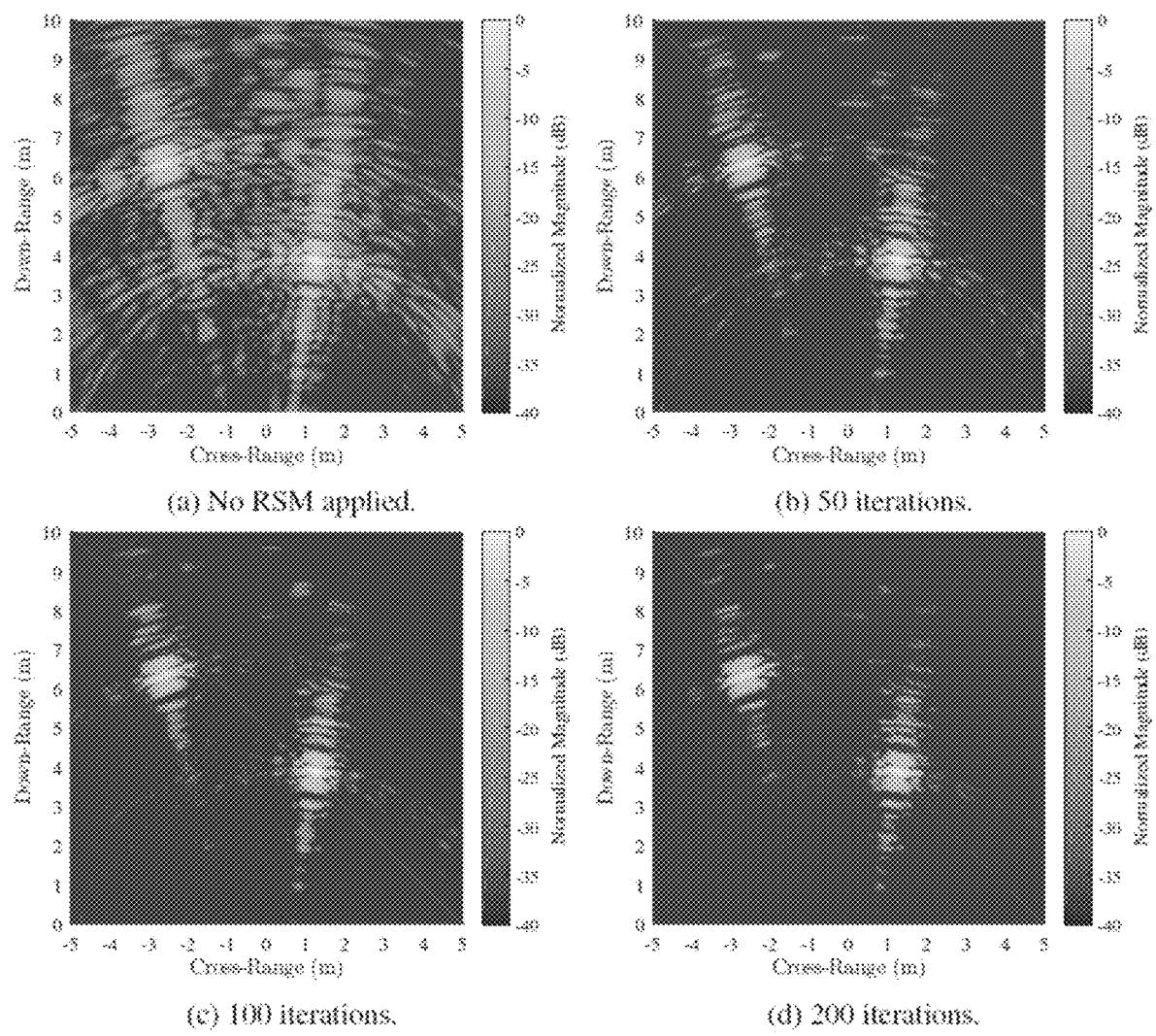
FIG. 8B shows results of the RSM processing.

The RSM test results are shown in FIG. 8B. Image (a) is the original radar image. A random number of antenna positions and frequency bands were excised during each iteration. Images (b), (c) and (d) are the resulting images after 50, 100 and 200 iterations, respectively. These results demonstrate application of the RSM technique results in approximately a 40-dB reduction in down- and cross-range sidelobes, but only for un-notched or slightly notched data. However, RSM is ineffective (against sidelobes in the down-range direction) when a large fraction of the frequency-band is notched.

Novel Processing Combining CLEAN-Notch and RSM, with Results.

Figure 9A:
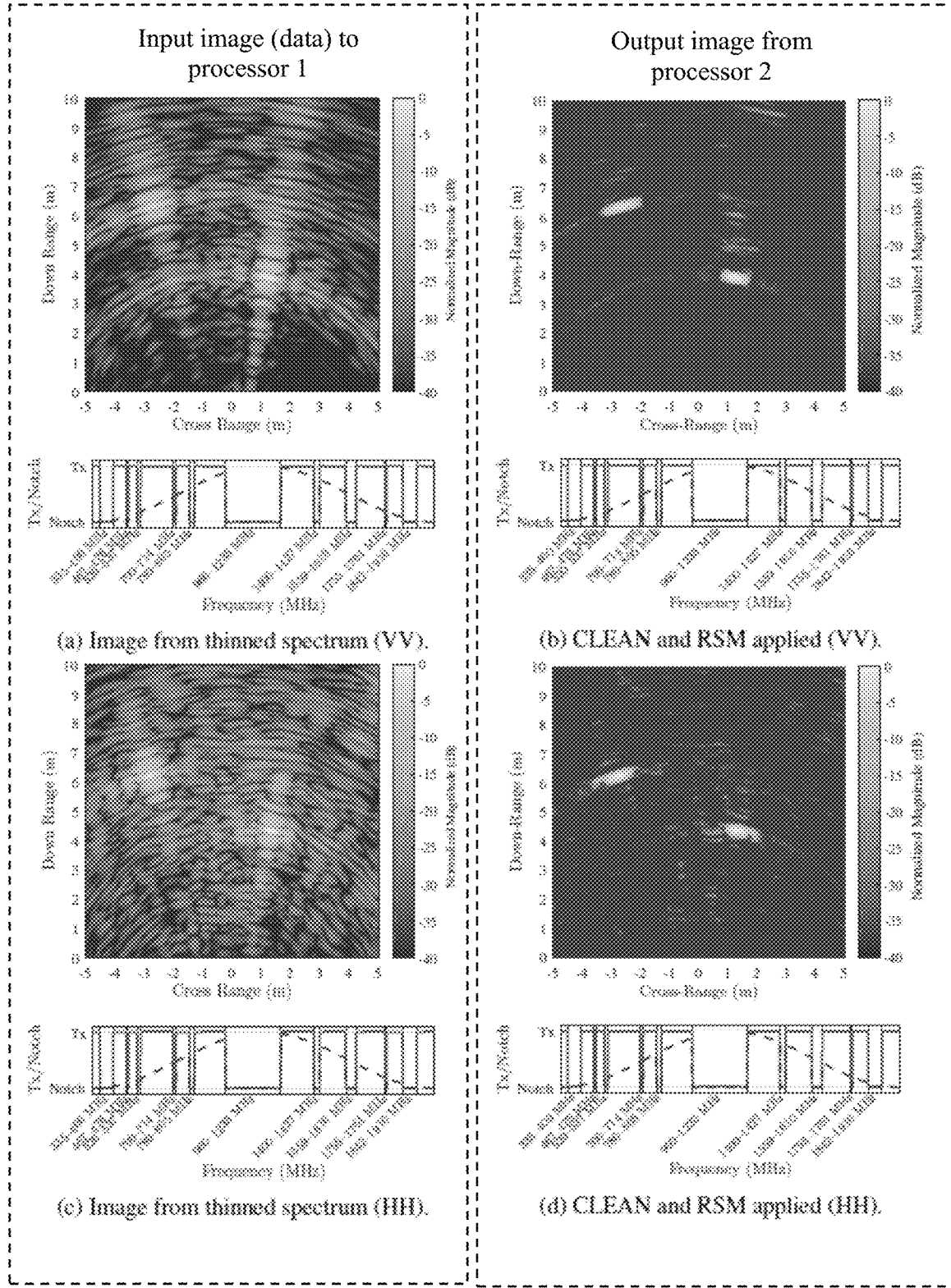
FIGS. 9A and 9B show results of the two example implementations of the novel signal processing of the present invention.
Figure 9B:
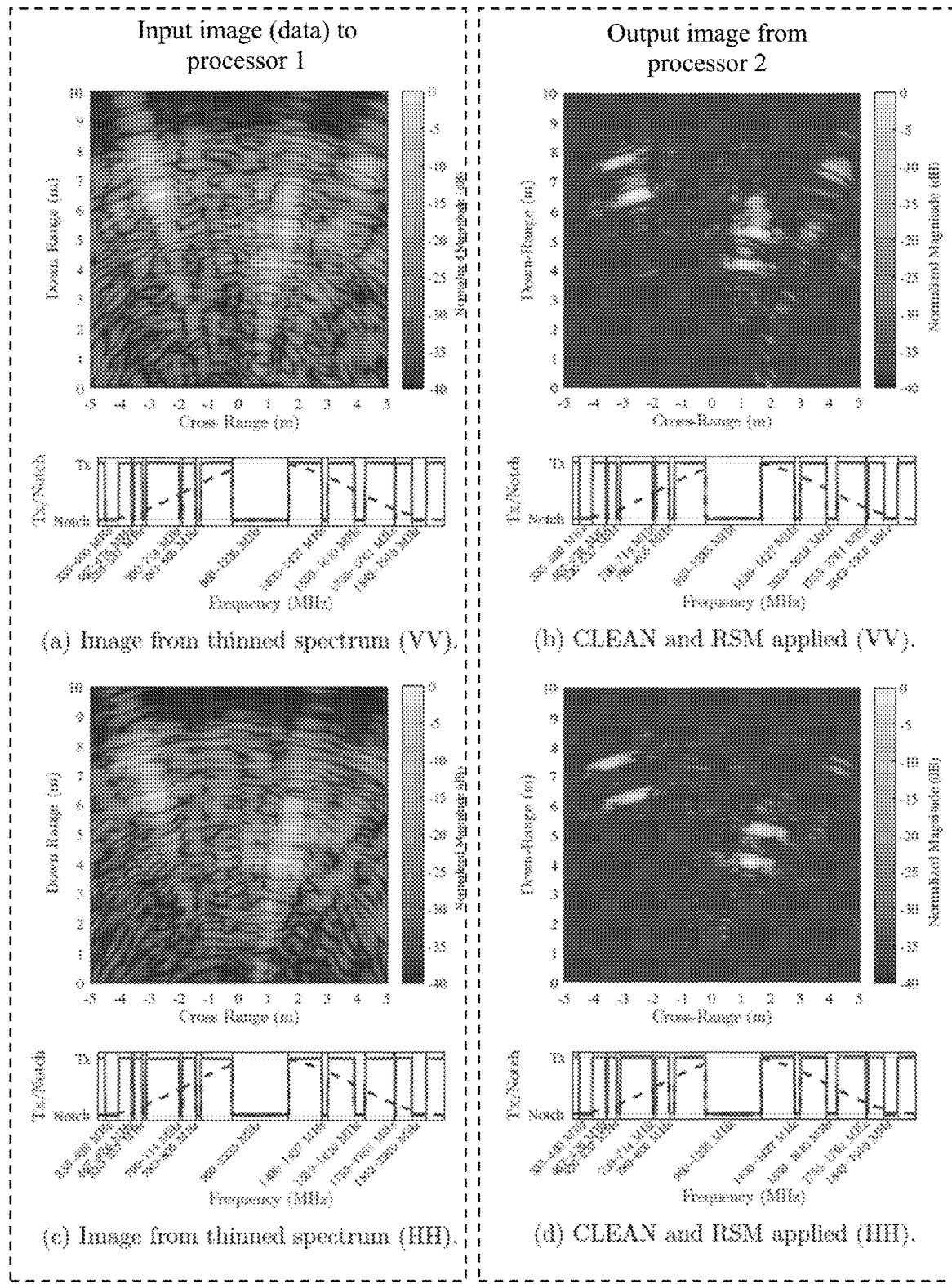

FIGS. 9A and 9B show results of the two example implementations of the novel signal processing of the present invention. The processing follows the methodology illustrated in FIG. 3.

In the first example, the CLEAN-Notch technique is applied ($N_{peaks}=2$) and then 200 iterations of RSM applied. (FIG. 9A). In the second example, the CLEAN-Notch technique is applied ($N_{peaks}=4$) and then 200 iterations of RSM applied. (FIG. 9B).

The notching was used for all cases, i.e., 40% effecting notching. All imagery was created by assuming two peaks were present corresponding to the two targets. The data corresponds to both VV polarizations and HH polarizations. (Note: VV is vertical transmit and vertical receive, in relation to polarization; HH is horizontal transmit and horizontal receive, in relation to polarization). Images (a) and (b) shows VV polarization images and Images (b) and (d) show HH polarization images. VH and HV images could also be generated thus allowing for full-polarimetric—operation within an RF congested environment. (Note: VH is vertical transmit and horizontal receive, in relation to polarization; HV is horizontal transmit and vertical receive, in relation to polarization.)

The results of the novel methodology which fuses the RSM and CLEAN-Notch algorithms demonstrate a target response to sidelobe suppression of ~40 dB, as well as recovery from >40% notched data. It is evident that the application of CLEAN-Notch subsequently followed by the RSM algorithm results in a vast improvement in radar imagery over that of the notched case. More so than applying the CLEAN-Notch or RSM algorithms alone. Thereby allowing for UWB radar systems to operate in heavily congested RF environments, while still maintaining their high-resolution imaging capabilities.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A method for processing radar image data from a radar system having one or more transmitter and receiver antenna pairs, the method comprising:
   (a) receiving radar data having frequency-domain notching in which select data at pre-determined frequency bands has been excised;
   (b) de-convolving the notched target responses from estimated target locations, and inserting the theoretical un-notched target responses at the estimated target locations;
   (c) subsequently performing a non-linear sidelobe-reduction algorithm; and
   (d) outputting an improved radar image which has a reduction in artifacts caused by frequency-domain notching.

2. The method of claim 1, wherein in step (c), the non-linear sidelobe-reduction algorithm is a recursive sidelobe minimization algorithm or a dual- or multi-apodization algorithm.

3. A method for processing radar image data from a radar system having one or more transmitter and receiver antenna pairs, the method comprising:
   (a) receiving radar data having frequency-domain notching in which select data at pre-determined frequency bands has been excised;

(b) forming notched high-resolution range profiles (HRRP) for each transmitter and receiver antenna pair from the notched radar data;

(c) forming a notched-frequency radar image from the notched radar data;

(d) determining a peak in intensity above a specified threshold in the notched-frequency radar image, (e) calculating the two-way distance for the location of the peak for each transmitter and receiver antenna pair.

(f) subtracting a 1-dimensional (1-D) theoretical notched point spread function (PSF), corresponding to the peak from the corresponding HRRP for each transmitter and receiver antenna pair;

(g) repeating steps (c)-(f), as necessary, until a predetermined conditional is satisfied for other peaks above the predetermined threshold;

(h) adding the 1-D theoretical un-notched PSF for each determined peak at the corresponding location for each transmitter and receiver antenna pairs to obtain an un-notched radar image;

(i) performing inverse Fourier transforms on the HRRPs to obtain frequency domain data from a current un-notched radar image;

(j) randomly selecting data points which are set to nil in order to form a partial-data radar image;

(k) performing a minimum operator on the current un-notched radar image with the partial-data radar image, resulting in an updated current un-notched radar image where each pixel is determined by the minimum between the absolute values of the corresponding pixel from the current un-notched radar image and the partial data radar image, wherein complex pixel information of the current un-notched radar image is replaced with the corresponding complex pixel information of the partial data radar image if the absolute value of that pixel in the partial radar image is less than that of the current un-notched radar image;

(l) repeating steps (j)-(k), as necessary, until a predetermined condition is satisfied; and (m) outputting an improved radar image which has a reduction in artifacts caused by frequency-domain notching.

4. The method of claim 3, wherein (i) the radar system is configured to avoid operation in the pre-determined frequency bands, or (ii) additional signal processing is performed on the radar data to excise the pre-determined frequency bands prior to step (b).

5. The method of claim 4, where the pre-determined frequency bands are selected to avoid radio frequency interference and/or restricted or regulated frequency bands.

6. The method of claim 3, wherein, in step (b), a back projection process is utilized.

7. The method of claim 3, wherein, in step (d), the predetermined condition is a peak-to-average-sidelobe ratio in the partially cleaned image or the number of targets expected.

8. The method of claim 3, wherein in the first iteration of step (d), the highest peak in intensity is determined.

9. The method of claim 3, wherein, in step (d), data within a specified distance of the location of a determined peak are neglected as subsequent peak candidates.

10. The method of claim 3, wherein, in step (e), a coordinate grid relative to the ground is defined corresponding to the image pixel locations, and the coordinates of all transmitter and receiver antennas are known.

11. The method of claim 3, wherein, in step (j), the number of randomly selected data points is less than the product of the number of aperture positions of, and the number of frequencies sampled by, the radar system.

12. The method of claim 3, wherein, in step (l), the predetermined condition is a peak-to-sidelobe ratio criteria or the number of targets expected.

13. The method of claim 3, wherein, in step (l), the predetermined condition is a predetermined number of iterations.

14. The method of claim 3, wherein the number of peaks in step (h) is pre-defined.

15. The method of claim 3, wherein the one or more transmitter and receiver antenna pairs are implemented using real antenna array and/or synthetic aperture radar.

16. A controller for use with a radar system having one or more transmitter and receiver antenna pairs configured to execute machine-executable instructions enabling the controller to implement the method of claim 1.

17. A spectrally agile radar system comprising the controller of claim 16.

* * * * *